US012647212B2

(12) United States Patent
Jiang

(10) Patent No.: US 12,647,212 B2
(45) Date of Patent: Jun. 2, 2026

(54) METHODS FOR PROCESSING DATA RECEPTION, RELATED COMMUNICATION APPARATUS AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 342 days.

(21) Appl. No.: 18/284,257

(22) PCT Filed: Mar. 30, 2021

(86) PCT No.: PCT/CN2021/084144
§ 371 (c)(1),
(2) Date: Sep. 26, 2023

(87) PCT Pub. No.: WO2022/205005
PCT Pub. Date: Oct. 6, 2022

(65) Prior Publication Data
US 2024/0163017 A1     May 16, 2024

(51) Int. Cl.
*H04W 4/00* (2018.01)
*H04L 1/1812* (2023.01)
*H04L 1/1867* (2023.01)
*H04W 72/23* (2023.01)

(52) U.S. Cl.
CPC .......... *H04L 1/1812* (2013.01); *H04L 1/1887* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2020/0153560 A1* | 5/2020 | Park | | H04L 1/1822 |
| 2021/0029513 A1* | 1/2021 | Rico Alvarino | .... | H04W 72/121 |
| 2022/0046739 A1* | 2/2022 | Huang | | H04L 5/0007 |

FOREIGN PATENT DOCUMENTS

| | | | | |
|---|---|---|---|---|
| CN | 110831183 A | 2/2020 | | |
| CN | 110999153 A | 4/2020 | | |
| EP | 3282725 A1 | 2/2018 | | |
| WO | WO-2022087202 A2 * | 4/2022 | .......... | H04L 1/1893 |

OTHER PUBLICATIONS

European Patent Application No. 21933685.6, Search and Opinion dated Mar. 14, 2024, 11 pages.

(Continued)

*Primary Examiner* — Zewdu A Beyen
(74) *Attorney, Agent, or Firm* — Cozen O'Connor

(57) ABSTRACT

A method for processing data reception includes: receiving a first downlink control information (DCI) sent by a network device, in which the first DCI is configured to indicate data transmission in a Hybrid Automatic Repeat reQuest (HARQ) process. The method further includes determining a type of data transmitted in the HARQ process indicated by the first DCI based on a type of the first DCI and contents included in the first DCI, in response to an identifier of a physical downlink control channel (PDCCH) corresponding to the first DCI as a broadcast or multicast scheduling identifier.

19 Claims, 6 Drawing Sheets network device 11 terminal device 12

(56) <div align="center">References Cited</div>

<div align="center">OTHER PUBLICATIONS</div>

CATT, "Discussion on other issues for MBS" 3GPP TSG RAN WG1 Meeting #104-e, R1-2100357, Jan. 2020, 3 pages.
PCT/CN2021/084144, International Search Report dated Jan. 1, 2022, 2 pages.
Mediatek Inc. "On 2-stage Downlink Control Information for NR" 3GPP TSG RAN WG1 Meeting #87, R1-1612121, Nov. 2016, 5 pages.
Chinese Patent Application No. 202180000916.5 First Office Action dated Jan. 22, 2025 with English translation, 17 pages.

* cited by examiner

network device 11                    terminal device 12

FIG. 1

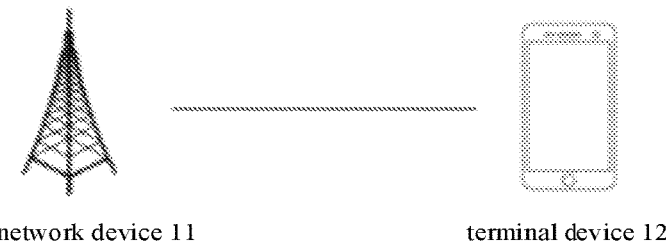

receive a first DCI sent by a network device, in which the first DCI is configured to indicate data transmission in a HARQ process ⟶ 21 determine a type of data transmitted in the HARQ process indicated by the first DCI based on a type of the first DCI and a content included in the first DCI, in response to an identifier of a PDCCH corresponding to the DCI as a broadcast or multicast scheduling identifier ⟶ 22

FIG. 2

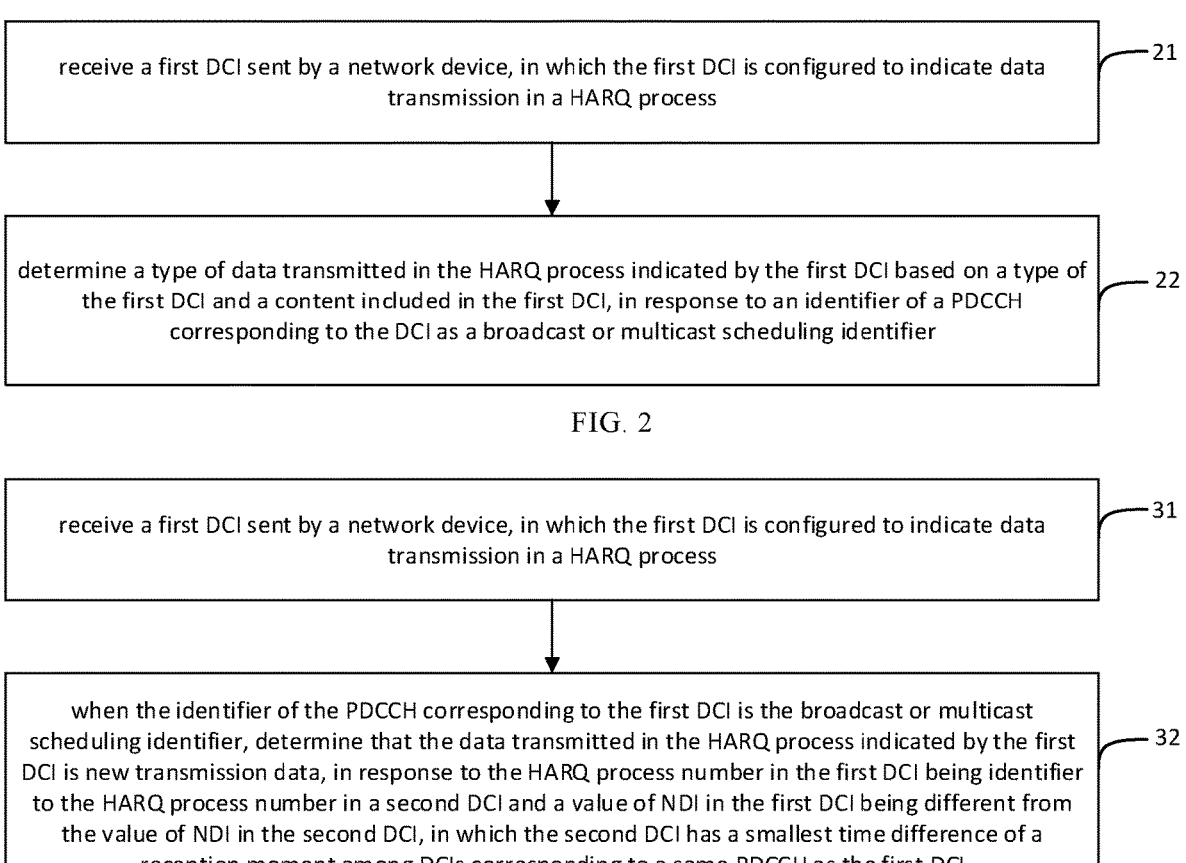

receive a first DCI sent by a network device, in which the first DCI is configured to indicate data transmission in a HARQ process ⟶ 31 when the identifier of the PDCCH corresponding to the first DCI is the broadcast or multicast scheduling identifier, determine that the data transmitted in the HARQ process indicated by the first DCI is new transmission data, in response to the HARQ process number in the first DCI being identifier to the HARQ process number in a second DCI and a value of NDI in the first DCI being different from the value of NDI in the second DCI, in which the second DCI has a smallest time difference of a reception moment among DCIs corresponding to a same PDCCH as the first DCI ⟶ 32

FIG. 3

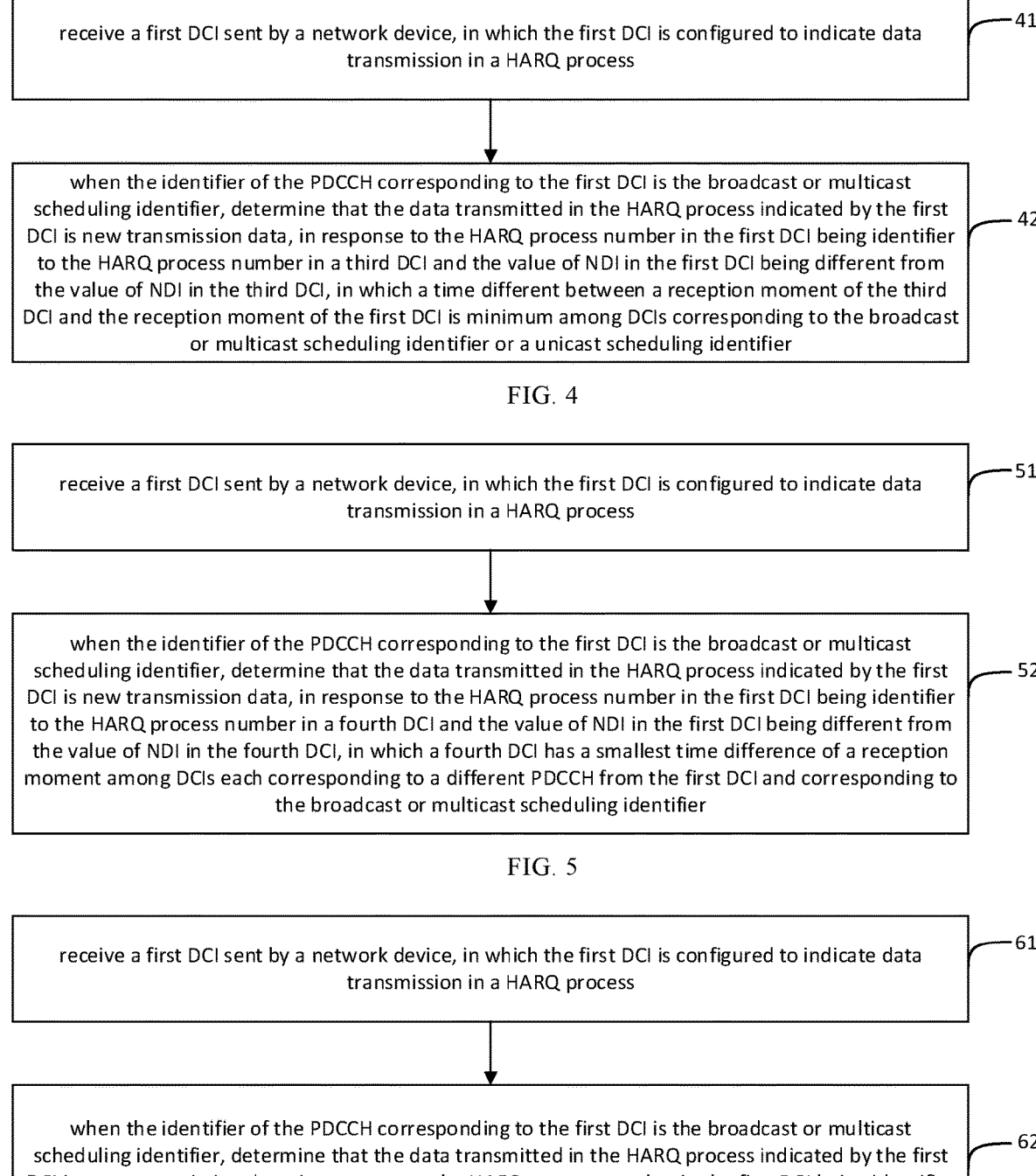

receive a first DCI sent by a network device, in which the first DCI is configured to indicate data transmission in a HARQ process ⌐41 when the identifier of the PDCCH corresponding to the first DCI is the broadcast or multicast scheduling identifier, determine that the data transmitted in the HARQ process indicated by the first DCI is new transmission data, in response to the HARQ process number in the first DCI being identifier to the HARQ process number in a third DCI and the value of NDI in the first DCI being different from the value of NDI in the third DCI, in which a time different between a reception moment of the third DCI and the reception moment of the first DCI is minimum among DCIs corresponding to the broadcast or multicast scheduling identifier or a unicast scheduling identifier ⌐42

FIG. 4 receive a first DCI sent by a network device, in which the first DCI is configured to indicate data transmission in a HARQ process ⌐51 when the identifier of the PDCCH corresponding to the first DCI is the broadcast or multicast scheduling identifier, determine that the data transmitted in the HARQ process indicated by the first DCI is new transmission data, in response to the HARQ process number in the first DCI being identifier to the HARQ process number in a fourth DCI and the value of NDI in the first DCI being different from the value of NDI in the fourth DCI, in which a fourth DCI has a smallest time difference of a reception moment among DCIs each corresponding to a different PDCCH from the first DCI and corresponding to the broadcast or multicast scheduling identifier ⌐52

FIG. 5 receive a first DCI sent by a network device, in which the first DCI is configured to indicate data transmission in a HARQ process ⌐61 when the identifier of the PDCCH corresponding to the first DCI is the broadcast or multicast scheduling identifier, determine that the data transmitted in the HARQ process indicated by the first DCI is new transmission data, in response to the HARQ process number in the first DCI being identifier to the HARQ process number in a fifth DCI, in which the fifth DCI has a smallest time difference of a reception moment among DCIs each corresponding to a different PDCCH from the first DCI and corresponding to the broadcast or multicast scheduling identifier or a unicast scheduling identifier ⌐62

FIG. 6

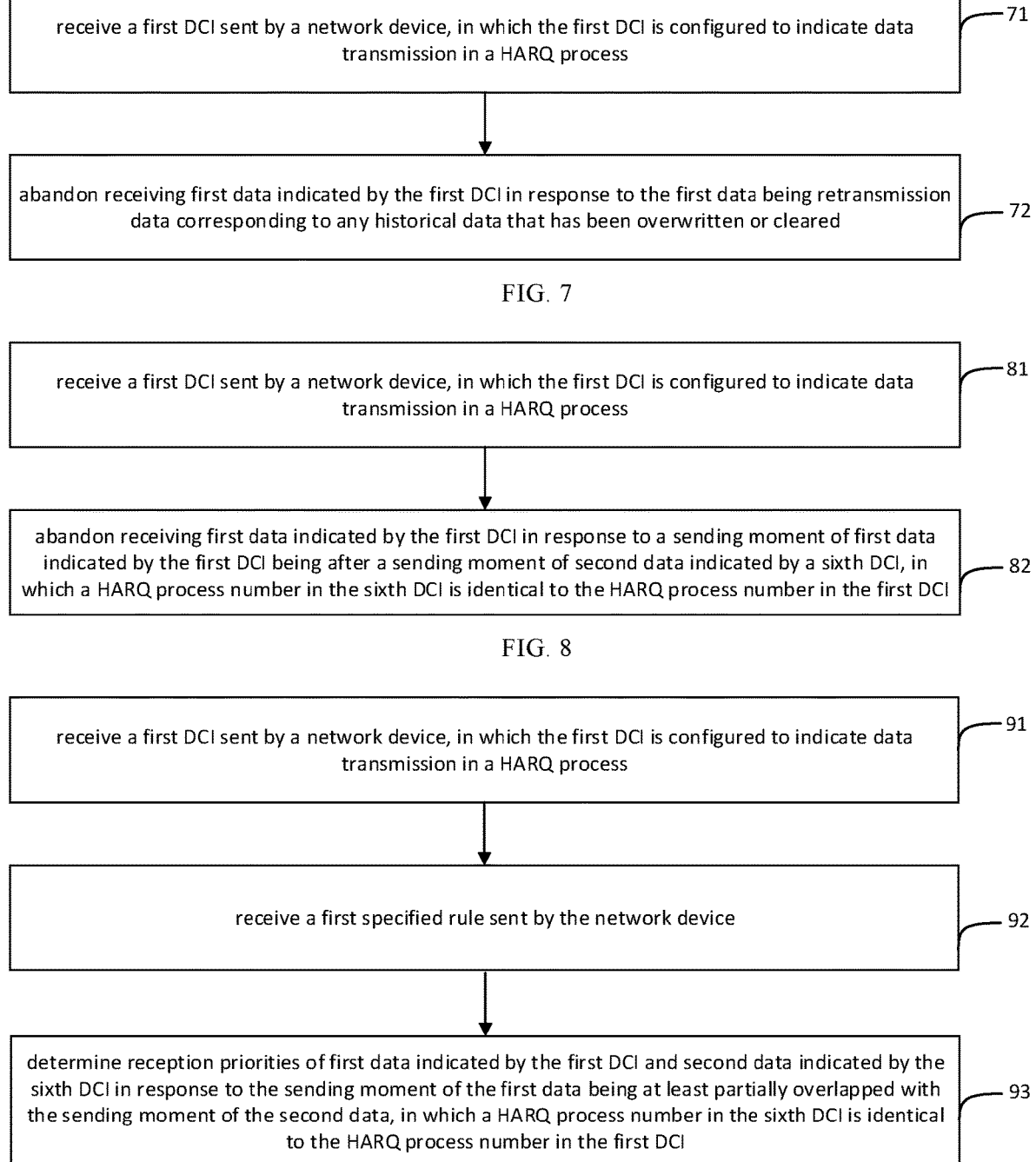

receive a first DCI sent by a network device, in which the first DCI is configured to indicate data transmission in a HARQ process — 71 abandon receiving first data indicated by the first DCI in response to the first data being retransmission data corresponding to any historical data that has been overwritten or cleared — 72

FIG. 7 receive a first DCI sent by a network device, in which the first DCI is configured to indicate data transmission in a HARQ process — 81 abandon receiving first data indicated by the first DCI in response to a sending moment of first data indicated by the first DCI being after a sending moment of second data indicated by a sixth DCI, in which a HARQ process number in the sixth DCI is identical to the HARQ process number in the first DCI — 82

FIG. 8 receive a first DCI sent by a network device, in which the first DCI is configured to indicate data transmission in a HARQ process — 91 receive a first specified rule sent by the network device — 92 determine reception priorities of first data indicated by the first DCI and second data indicated by the sixth DCI in response to the sending moment of the first data being at least partially overlapped with the sending moment of the second data, in which a HARQ process number in the sixth DCI is identical to the HARQ process number in the first DCI — 93

FIG. 9

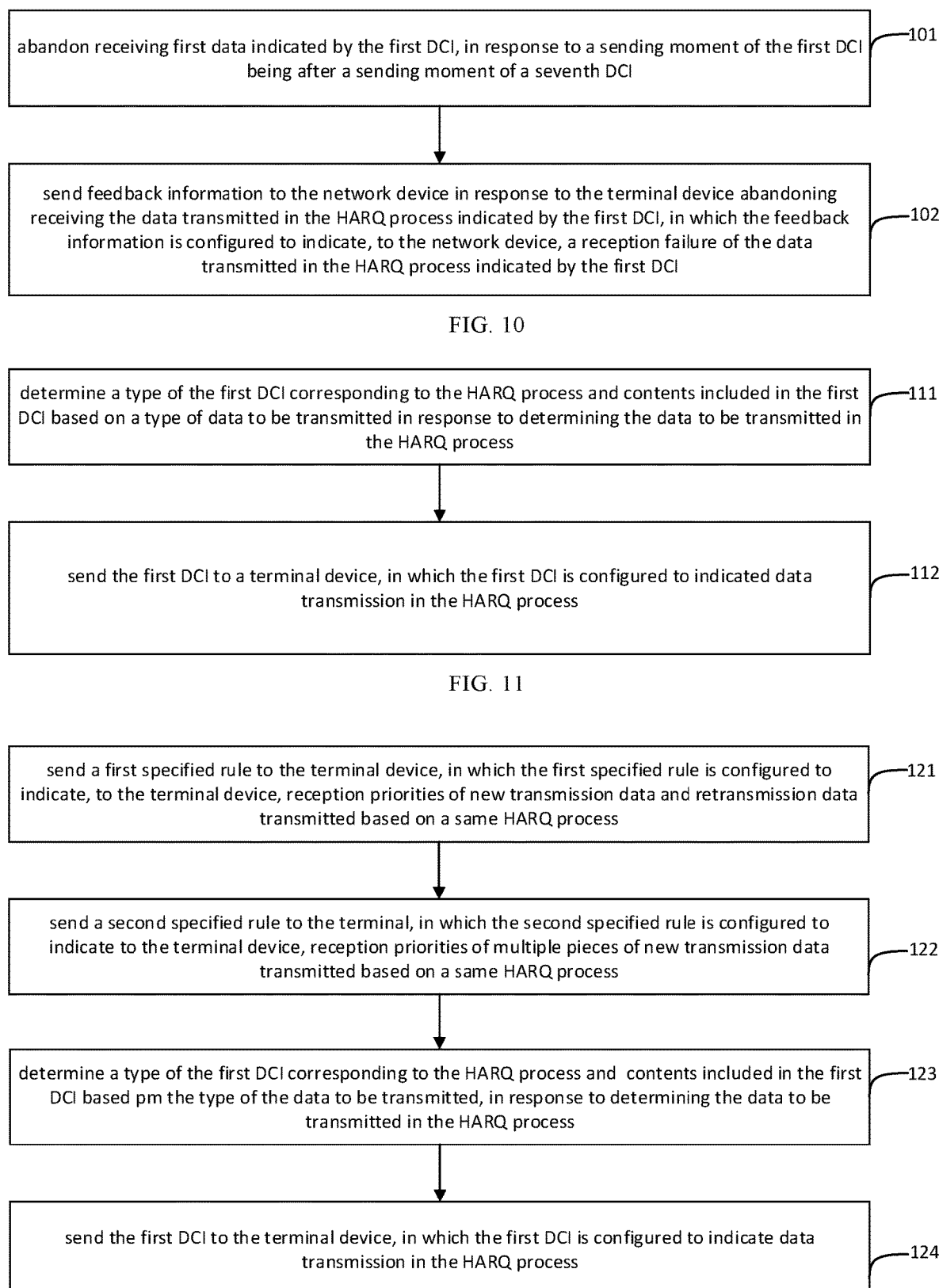

abandon receiving first data indicated by the first DCI, in response to a sending moment of the first DCI being after a sending moment of a seventh DCI ⌐—101 send feedback information to the network device in response to the terminal device abandoning receiving the data transmitted in the HARQ process indicated by the first DCI, in which the feedback information is configured to indicate, to the network device, a reception failure of the data transmitted in the HARQ process indicated by the first DCI ⌐—102

FIG. 10 determine a type of the first DCI corresponding to the HARQ process and contents included in the first DCI based on a type of data to be transmitted in response to determining the data to be transmitted in the HARQ process ⌐—111 send the first DCI to a terminal device, in which the first DCI is configured to indicated data transmission in the HARQ process ⌐—112

FIG. 11 send a first specified rule to the terminal device, in which the first specified rule is configured to indicate, to the terminal device, reception priorities of new transmission data and retransmission data transmitted based on a same HARQ process ⌐—121 send a second specified rule to the terminal, in which the second specified rule is configured to indicate to the terminal device, reception priorities of multiple pieces of new transmission data transmitted based on a same HARQ process ⌐—122 determine a type of the first DCI corresponding to the HARQ process and contents included in the first DCI based pm the type of the data to be transmitted, in response to determining the data to be transmitted in the HARQ process ⌐—123 send the first DCI to the terminal device, in which the first DCI is configured to indicate data transmission in the HARQ process ⌐—124

FIG. 12

METHODS FOR PROCESSING DATA RECEPTION, RELATED COMMUNICATION APPARATUS AND STORAGE MEDIUM

CROSS-REFERENCE TO RELATED APPLICATION

This application is a national phase of International Application No. PCT/CN2021/084144, filed on Mar. 30, 2021, the content of which is hereby incorporated by reference in its entirety.

TECHNICAL FIELD

The disclosure relates to the field of communication technology, in particular to a data reception processing method and an apparatus thereof.

BACKGROUND

In a communication system, a network device schedules a multicast broadcast service (MBS) in a broadcast or multicast scheduling manner or in a unicast scheduling manner. For a terminal device, since signal reception qualities of different terminal devices may be different, some terminal devices may receive multiple pieces of scheduling indication information.

SUMMARY

According to a first aspect, a method for processing data reception, performed by a terminal device, is provided. The method includes: receiving a first downlink control information (DCI) sent by a network device, in which the first DCI is configured to indicate data transmission in a Hybrid Automatic Repeat reQuest (HARQ) process; and determining a type of data transmitted in the HARQ process indicated by the first DCI based on a type of the first DCI and contents included in the first DCI, in response to an identifier of a physical downlink control channel (PDCCH) corresponding to the first DCI as a broadcast or multicast scheduling identifier.

According to a second aspect, another method for processing data reception, performed by a network device, is provided. The method includes: determining a type of a first downlink control information (DCI) corresponding to a Hybrid Automatic Repeat reQuest (HARQ) process and contents included in the first DCI based on a type of the data to be transmitted, in response to determining the data to be transmitted in the HARQ process; and sending the first DCI to a terminal device, in which the first DCI is configured to indicate data transmission in the HARQ process.

According to a third aspect, a communication device is provided. The communication device includes a processor. When the processor calls a computer program stored in a memory, the method described in the first aspect above is executed.

BRIEF DESCRIPTION OF THE DRAWINGS

In order to clearly illustrate technical solutions of embodiments of the disclosure or background technologies, a description of drawings used in the embodiments or the background technologies is given below.

FIG. 1 is a schematic diagram of a communication system according to an embodiment of the disclosure.

FIG. 2 is a flowchart of a method for processing data reception according to an embodiment of the disclosure.

FIG. 3 is a flowchart of a data reception processing method according to an embodiment of the disclosure.

FIG. 4 is a flowchart of a method for processing data reception according to another embodiment of the disclosure.

FIG. 5 is a flowchart of a method for processing data reception according to still another embodiment of the disclosure.

FIG. 6 is a flowchart of a method for processing data reception according to yet another embodiment of the disclosure.

FIG. 7 is a flowchart of a method for processing data reception according to yet another embodiment of the disclosure.

FIG. 8 is a flowchart of a method for processing data reception according to yet another embodiment of the disclosure.

FIG. 9 is a flowchart of a method for processing data reception according to yet another embodiment of the disclosure.

FIG. 10 is a flowchart of a method for processing data reception according to yet another embodiment of the disclosure.

FIG. 11 is a flowchart of a method for processing data reception according to yet another embodiment of the disclosure.

FIG. 12 is a flowchart of a method for processing data reception according to yet another embodiment of the disclosure.

DETAILED DESCRIPTION

Figure 13:
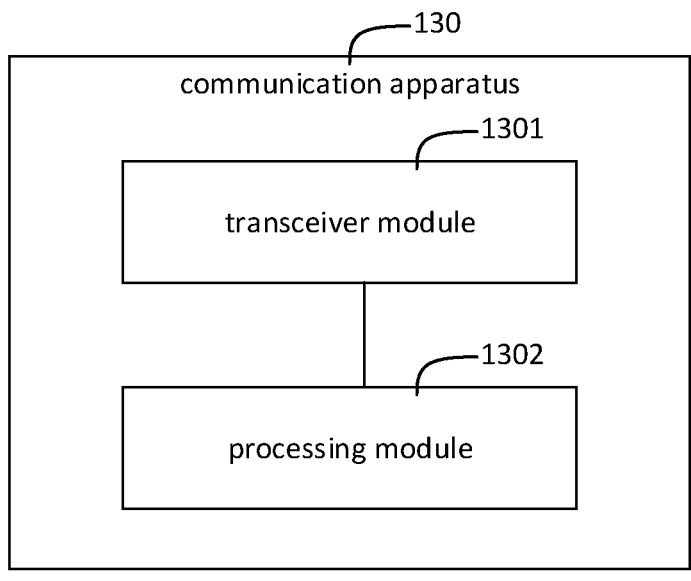
FIG. 13 is a schematic diagram of a communication apparatus according to an embodiment of the disclosure.

For ease of understanding, the terms involved in this disclosure are introduced at first.

1. Multimedia Broadcast and Multicast Service (MBMS) or Multimedia Broadcast Service (MBS)

The MBS is a practical technique to improve spectrum usage efficiency, which is widely used in communication systems. In a 5G new radio access technology (RAT) system, MBS can be sent through a physical downlink shared channel (PDSCH) scheduled by a physical downlink control channel (PDCCH).

The PDCCH is indicated by a specific MBS scheduling identifier, e.g., group radio network temporary identity (G-RNTI) or cell radio network temporary identifier (C-RNTI).

The G-RNTI is configured to indicate that the PDCCH scheduling is a broadcast or multicast scheduling, and C-RNTI is configured to indicate that the PDCCH scheduling is a unicast scheduling.

2. Downlink Control Information (DCI)

The DCI may include uplink and downlink resource allocation, hybrid automatic repeat request (HARD) information, power control, and the like.

In order to better understand the method for processing data reception according to embodiments of the disclosure, the communication system used in the embodiments of the disclosure is first described below.

As illustrated in FIG. 1, FIG. 1 is a schematic diagram of a communication system according to an embodiment of the disclosure. The communication system may include, but is not limited to, a network device and a terminal device. The number and the form of devices illustrated in FIG. 1 are only examples and do not constitute a limitation on the embodiments of the disclosure, and two or more network devices and two or more terminal devices may be included in practical applications. The communication system illustrated in FIG. 1 includes, for example, one network device 11 and one terminal device 12.

It is noteworthy that the technical solutions according to the embodiments of the disclosure can be applied to various communication systems, such as, a long term evolution (LTE) system, a 5th generation (5G) mobile communication system, a 5G new radio (NR) system, or other future new mobile communication systems.

The network device 11 in the embodiments of the disclosure is an entity on a network side for transmitting or receiving signals. For example, the network device 11 may be an evolved NodeB (eNB), a transmission reception point (TRP), a next generation NodeB (gNB) in a NR system, a base station in other future mobile communication systems, or an access node in a wireless fidelity (WiFi) system. The specific technology and specific device form adopted by the network device are not limited in the embodiments of the disclosure. The network device according to the embodiments of the disclosure consists of a central unit (CU) and a distributed unit (DU). The CU may also be called control unit. The use of CU-DU structure allows a protocol layer of the network device, such as a base station, to be split, some of the functions of the protocol layer are placed in the CU for centralized control, and some or all of the remaining functions are distributed in the DU, which is centrally controlled by the CU.

The terminal device 12 in the embodiments of the disclosure is an entity on a user side for receiving or transmitting signals, such as a cellular phone. The terminal device may also be referred to as terminal, user equipment (UE), mobile station (MS), mobile terminal (MT), and the like. The terminal device can be a car with communication functions, a smart car, a mobile phone, a wearable device, a Pad, a computer with wireless transceiver functions, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, etc. The specific technology and specific device form adopted by the terminal device are not limited in the embodiments of the disclosure.

It is understandable that the communication system described in the embodiments of the disclosure is intended to clearly illustrate the technical solutions of the embodiments of the disclosure, and does not constitute a limitation on the technical solutions provided by the embodiments of the disclosure. It is understandable by those skilled in the art that as system architectures evolve and new business scenarios emerge, the technical solutions according to the embodiments of the disclosure are also applicable to similar technical problems.

In a communication system, a network device schedules a MBS in a broadcast or multicast scheduling manner or in a unicast scheduling manner. For a terminal device, since signal reception qualities of different terminal devices may be different, some terminal devices may receive multiple pieces of scheduling indication information. How to make the terminal device and the network device maintain the same understanding of broadcast or multicast scheduling indication information and unicast scheduling indication information to avoid data loss is a problem that needs to be solved urgently.

A method for processing data reception and an apparatus thereof will be introduced in detail below with reference to the accompanying drawings. The methods and the apparatuses can be applied to a field of communication technologies. A terminal device can receive a first DCI sent by a network device. If an identifier of a PDCCH corresponding to the first DCI is a broadcast or multicast scheduling identifier, a type of data transmitted in a Hybrid Automatic Repeat reQuest (HARQ) process indicated by the first DCI is determined based on a type of the first DCI and contents included in the first DCI. Therefore, the terminal device and the network device may have the same understanding of data transmission indication, to effectively avoid data loss and improve a reliability of data transmission.

Various moments involved in the embodiments of the disclosure are numbered in order of time. For example, for the moment t1, the moment t2, the moment t3, t2 is after t1 and t3 is after t2, which is not limited in the disclosure.

As illustrated in FIG. 2, FIG. 2 is a flowchart of a data reception processing method according to an embodiment of the disclosure. The method is performed by a terminal device. As illustrated in FIG. 2, the method includes, but is not limited to the following.

At step 21, a first downlink control information (DCI) sent by a network device is received. The first DCI is configured to indicate data transmission in a Hybrid Automatic Repeat reQuest (HARQ) process.

It is understandable that the network device can send the first DCI to the terminal device, in response to determining data transmission in the HARQ process. The first DCI may be a DCI of a PDCCH indicated by a group radio network temporary identity (G-RNTI) or a DCI of a PDCCH indicated by a cell radio network temporary identity (C-RNTI), which is not limited in the disclosure.

After receiving the first DCI, the terminal device can determine data transmission in the HARQ process indicated by the first DCI.

At step 22, a type of data transmitted in the HARQ process indicated by the first DCI is determined based on a type of the first DCI and contents included in the first DCI, in response to an identifier of a PDCCH corresponding to the first DCI as a broadcast or multicast scheduling identifier.

The identifier of the PDCCH may be a unicast scheduling identifier, such as C-RNTI, or the broadcast or multicast scheduling identifier, such as G-RNTI, which is not limited in the disclosure.

Correspondingly, the type of the first DCI may be a DCI with the unicast scheduling identifier, or a DCI with the broadcast or multicast scheduling identifier, which is not limited in the disclosure.

In some examples, the style or presentation form of the unicast scheduling identifier can be set in advance based on the protocol agreement or network device configuration, such as the C-RNTI-1 and the C-RNTI-2, which is not limited in the disclosure.

In some examples, the style or presentation form of the broadcast or multicast scheduling identifier can be set in advance based on the protocol agreement or network device configuration, such as the G-RNTI-1 and the G-RNTI-2, which is not limited in the disclosure.

In some examples, the type of the first DCI may be determined based on the radio network temporary identity (RNTI) corresponding to the first DCI.

For example, if the PDCCH corresponding to the first DCI is indicated by a C-RNTI, i.e., the RNTI corresponding to the first DCI is a C-RNTI, then the type of the first DCI may be the DCI with the unicast scheduling identifier, i.e., the type of the PDCCH indicated by the C-RNTI. Or, if the PDCCH corresponding to the first DCI is indicated by the C-RNTI, i.e., the RNTI corresponding to the first DCI is a G-RNTI, then the type of the first DCI may be the DCI with the broadcast or multicast scheduling identifier, i.e., the type of the PDCCH indicated by the G-RNTI, which is not limited in the disclosure.

In some embodiments, the contents included in the first DCI include at least one of: a value of new data indicator (NDI) or a HARQ process number.

In some examples, possible values of NDI may be set in advance based on the protocol agreement or network device configuration. For example, the value of NDI may be 1 or 0, which is not limited in the disclosure.

In some examples, the style or presentation form of the HARQ process number may be set in advance, such as, HARQ process 1 or HARQ process 2, which is not limited in the disclosure.

In addition, the type of data transmitted in the HARQ process indicated by the first DCI may be new transmission data or retransmission data, which is not limited in the disclosure.

In some examples, the type of data transmitted in the HARQ process indicated by the first DCI may be determined based on the type of the first DCI and the contents included in the first DCI, based on the protocol agreement or the configuration of the network device.

For example, based on the protocol agreement, if the type of the DCI is that the PDCCH is indicated by the G-RNTI and the value of NDI included in the DCI is 0, then the type of data transmitted in the HARQ process indicated by the DCI is the new transmission data; if the type of the DCI is that the PDCCH is indicated by the G-RNTI and the value of NDI included in the DCI is 1, then the type of data transmitted in the HARQ process indicated by the DCI is the retransmission data; if the type of the DCI is that the PDCCH is indicated by the C-RNTI and the value of NDI included in the DCI is 1, then the type of data transmitted in the HARQ process indicated by the DCI is the new transmission data; and if the type of the DCI is that the PDCCH is indicated by the C-RNTI and the value of NDI included in the DCI is 0, then the type of data transmitted in the HARQ process indicated by the DCI is the retransmission data.

Therefore, when the terminal device receives the first DCI of the PDCCH indicated by the G-RNTI-1 and the value of NDI included in the first DCI is 1, based on the protocol agreement, it can be determined that the type of data transmitted in the HARQ process indicated by the first DCI is the retransmission data.

It is noteworthy that the above examples are merely illustrative and cannot be taken as a limitation of the embodiments of the disclosure for determining the type of the first DCI, the contents included therein, or the manner of determining the type of the data transmitted in the HARQ process indicated by the first DCI.

It is understandable that after determining the type of the data transmitted in the HARQ process indicated by the first DCI, the terminal device can process the received data based on the determined type of the data.

For example, when the received data is new transmission data of a certain HARQ process, the terminal device may store the new transmission data into a cache of the HARQ process. If there is old data previously stored in the HARQ process, the old data will be overwritten by the new transmission data. Or, when the received data is retransmission data of a certain HARQ process, the terminal device may combine the retransmission data with the old data previously stored in this HARQ process and decode the combined data, which can effectively avoid data loss.

In some embodiments of the disclosure, the terminal device can receive the first DCI sent by the network device. The identifier of the PDCCH corresponding to the first DCI is the broadcast or multicast scheduling identifier. The terminal device can determine the type of the data transmitted in the HARQ process indicated by the first DCI based on the type of the first DCI and the contents included in the first DCI. Therefore, the terminal device can accurately determine the type of the transmitted data, so that the terminal device and the network device have a consistent understanding of data transmission indication, which effectively avoids data loss and improves the reliability of data transmission.

As illustrated in FIG. 3, FIG. 3 is a flowchart of a method for processing data reception according to an embodiment of the disclosure. The method is performed by a terminal device. As illustrated in FIG. 3, the method may include, but is not limited to, the following.

At step 31, a first DCI sent by a network device is received, in which the first DCI is configured to indicate data transmission in a HARQ process.

In some examples, the contents included in the first DCI include at least one of: a value of NDI or a HARQ process number.

It is noteworthy that the specific content, such as the value of NDI and the HARQ process number, and the implementation form can be referred to various other embodiments of the disclosure and will not be repeated herein.

At step 32, when the identifier of the PDCCH corresponding to the first DCI is the broadcast or multicast scheduling identifier, it is determined that the data transmitted in the HARQ process indicated by the first DCI is new transmission data, in response to the HARQ process number in the first DCI being identical to a HARQ process number in a second DCI and the value of NDI in the first DCI being different from a value of NDI in the second DCI. The second DCI has a smallest time difference of a reception moment among DCIs corresponding to a same PDCCH as the first DCI.

It is noteworthy that the specific content and the implementation form of the identifier of the PDCCH can be referred to various other embodiments of the disclosure and will not be repeated herein.

In some examples, the same PDCCH includes at least one of: same scheduling identifier information of the PDCCH, or same resource configuration information of the PDCCH.

For example, the scheduling identifier information of the PDCCH corresponding to the first DCI and the scheduling identifier information of the PDCCH corresponding to the second DCI are the same, i.e., both the first DCI and the second DCI correspond to the PDCCH indicated by the G-RNTI-1 or both the first DCI and the second DCI correspond to the PDCCH indicated by the G-RNTI-2, which is not limited in the disclosure.

It is understandable that the same resource configuration information of the PDCCH may be the same time domain resource configuration information, for example, the same search space (SS) configuration, which is not limited in the disclosure.

Or, the same resource configuration information of the PDCCH can be the same frequency domain resource configuration information, for example, the same control resource set (CORESET) configuration, which is not limited in the disclosure.

For example, the terminal device receives a DCI of a PDCCH indicated by a G-RNTI-1 at the moment t1, the HARQ process number in the DCI is 1, and the value of NDI in the DCI is 1. The terminal device receives a DCI of a PDCCH indicated by a C-RNTI-1 at the moment t2, the HARQ process number in the DCI is 1, and the value of NDI in the DCI is 1. After that, the terminal device receives a first DCI of a PDCCH indicated by a G-RNTI-1 at the moment t3, the HARQ process number in the first DCI is 1, and the value of NDI in the first DCI is 0. It can be seen by comparison that the PDCCH corresponding to the DCI received by the terminal device at the moment t1 is the same as the PDCCH corresponding to the first DCI, and the HARQ process numbers in the DCI received at the moment T1 and the first DCI are the same. Therefore, the DCI received at the moment t1 is the above-mentioned "second DCI". Since the value of NDI in the first DCI is 0 and the value of NDI in the second DCI is 1, i.e., these two values of NDI are different, it can be determined that the first DCI indicates that the data transmitted in the HARQ process 1 is the new transmission data.

Or, the terminal device receives a DCI of a PDCCH indicated by a G-RNTI-1 at the moment t1, the HARQ process number in the DCI is 1, and the value of NDI in the DCI is 1. The terminal device receives a DCI of a PDCCH indicated by a C-RNTI-1 at the moment t2, the HARQ process number in the DCI is 1, and the value of NDI in the DCI is 1. The terminal device receives a DCI of a PDCCH indicated by a G-RNTI-1 at the moment t3, the HARQ process number in the DCI is 1, and the value of NDI in the DCI is 0. After that, the terminal device receives a first DCI on a PDCCH indicated by a G-RNTI-1 at the moment t4, the HARQ process number in the first DCI is 1, and the value of NDI in the first DCI is 1. It can be seen by comparison that the PDCCHs corresponding to the DCIs received by the terminal device at the moment t1 and the moment t3 are the same as the PDCCH corresponding to the first DCI, the HARQ process numbers in these DCIs are the same, and a time difference between a reception moment of the DCI received at the moment t3 and a reception moment of the first DCI is the minimum. Therefore, it is determined that the DCI received at the moment t3 is the above-mentioned "second DCI". Since the value of NDI in the first DCI is 1 and the value of NDI in the second DCI is 0, i.e., these two values of NDI are different, it can be determined that the first DCI indicates that the data transmitted in the HARQ process 1 is the new transmission data.

It is noteworthy that the above HARQ process number, the value of NDI, or the like are merely schematic illustrations and cannot be used as a limitation on the HARQ process number, the value of NDI, and the determination of the type of the data transmitted in the HARQ process indicated by the first DCI in the embodiments of the disclosure.

In some examples, when the identifier of the PDCCH corresponding to the first DCI is the broadcast or multicast scheduling identifier, it is determined that the data transmitted in the HARQ process indicated by the first DCI is the retransmission data, in response to the HARQ process number in the first DCI being identical to the HARQ process number in the second DCI and the value of NDI in the first DCI being identical to the value of NDI in the second DCI, in which the second DCI has a smallest time difference of a reception moment among DCIs corresponding to a same PDCCH as the first DCI.

For example, the terminal device receives a DCI of a PDCCH indicated by a G-RNTI-1 at the moment t1, the HARQ process number in the DCI is 1, and the value of NDI in the DCI is 1. The terminal device receives a DCI of a PDCCH indicated by a C-RNTI-1 at the moment t2, the HARQ process number in the DCI is 1, and the value of NDI in the DCI is 1. After that, the terminal device receives a first DCI of a PDCCH indicated by a G-RNTI-1 at the moment t3, the HARQ process number in the first DCI is 1, and the value of NDI in the first DCI is 0. It can be seen by comparison that the PDCCH corresponding to the DCI received by the terminal device at the moment t1 is the same as the PDCCH corresponding to the first DCI, and the HARQ process numbers in these DCIs are the same. Therefore, the DCI received at the moment t1 is the above-mentioned "second DCI". Since the value of NDI in the first DCI is identical to the value of NDI in the second DCI, it can be determined that the first DCI indicates that the data transmitted in the HARQ process 1 is the retransmission data.

It is noteworthy that the above HARQ process number, the value of NDI, and the like are merely schematic illustrations, and cannot be used as a limitation on the HARQ process number, the value of NDI, and the determination of the type of the data transmitted in the HARQ process indicated by the first DCI, and the like, in the embodiments of the disclosure.

In some embodiments of the disclosure, the terminal device may receive the first DCI sent by the network device, and determine the type of the data transmitted in the HARQ process indicated by the first DCI based on the HARQ process number and the value of NDI in the second DCI has a smallest time difference of a reception moment among DCIs corresponding to a same PDCCH as the first DCI, as well as the HARQ process number and the value of NDI in the first DCI. Therefore, the terminal device can accurately determine the type of the data transmission, so that the terminal device and the network device have a consistent understanding of data transmission indication, which effectively avoids data loss and improves the reliability of data transmission.

As illustrated in FIG. 4, FIG. 4 is a flowchart of a method for processing data reception according to an embodiment of the disclosure. The method is performed by a terminal device. As illustrated in FIG. 4, the method may include, but is not limited to, the following.

At step 41, a first DCI sent by a network device is received, in which the first DCI is configured to indicate data transmission in a HARQ process.

In some examples, the contents included in the first DCI include at least one of: a value of NDI or a HARQ process number.

It is noteworthy that the specific content, such as the value of NDI and the HARQ process number, and the implementation form can be referred to various other embodiments of the disclosure and will not be repeated herein.

At step 42, when the identifier of the PDCCH corresponding to the first DCI is the broadcast or multicast scheduling identifier, it is determined that the data transmitted in the HARQ process indicated by the first DCI is new transmission data, in response to the HARQ process number in the first DCI being identical to a HARQ process number in a third DCI, and the value of NDI in the first DCI being different from a value of NDI in the third DCI, in which a time different between a reception moment of the third DCI and the reception moment of the first DCI is minimum among DCIs corresponding to the broadcast or multicast scheduling identifier or a unicast scheduling identifier.

It is noteworthy that the specific content and the implementation form of the identifier of the PDCCH, the unicast scheduling identifier or the broadcast or multicast scheduling identifier can be referred to various other embodiments of the disclosure and will not be repeated herein.

For example, the terminal device receives a DCI of a PDCCH indicated by a G-RNTI-1 at the moment t1, the HARQ process number in the DCI is 1, and the value of NDI in the DCI is 1. The terminal device receives a DCI of a PDCCH indicated by a C-RNTI-1 at the moment t2, the HARQ process number in the DCI is 1, and the value of NDI in the DCI is 1. After that, the terminal device receives a first DCI of a PDCCH indicated by a G-RNTI-1 at the moment t3, the HARQ process number in the first DCI is 1, and the value of NDI in the first DCI is 0. It can be seen by comparison that the PDCCH corresponding to the DCI received by the terminal device at the moment t1 is the same as the PDCCH corresponding to the first DCI, and the HARQ process numbers in these DCIs are the same. The DCI received at the moment t1 is the above-mentioned "third DCI". Since the value of NDI in the first DCI is 0, and the value of NDI in the third DCI is 1, i.e., these two values of NDI are different, it can be determined that the first DCI indicates that the data transmitted in the HARQ process 1 is the new transmission data.

Or, the terminal device receives a DCI of a PDCCH indicated by a G-RNTI-1 at the moment t1, the HARQ process number in the DCI is 1, and the value of NDI in the DCI is 1. The terminal device receives a DCI of a PDCCH indicated by a C-RNTI-1 at the moment t2, the HARQ process number in the DCI is 1, and the value of NDI in the DCI is 1. After that, the terminal device receives a first DCI of a PDCCH indicated by a G-RNTI-1 at the moment t3, the HARQ process number in the first DCI is 1, and the value of NDI in the first DCI is 0. It can be seen by comparison that the DCI received by the terminal device at the moment t2 is a DCI with the unicast scheduling identifier, while the first DCI is a DCI with the broadcast or multicast scheduling identifier, and the HARQ process number of the DCI received at the moment t2 is the same as the HARQ process number of the first DCI. The DCI received at the moment t2 is the above-mentioned "third DCI". Since the value of NDI in the first DCI is 0 and the value of NDI in the third DCI is 1, i.e., these two values of NDI are different, it can be determined that the first DCI indicates that the data transmitted in the HARQ process 1 is the new transmission data.

It is noteworthy that the above HARQ process number, the value of NDI, and the like are merely schematic illustrations and cannot be used as a limitation on the HARQ process number, the value of NDI, and the determination of the type of the data transmitted in the HARQ process indicated by the first DCI, and the like, in the embodiments of the disclosure.

In some examples, when the identifier of the PDCCH corresponding to the first DCI is the broadcast or multicast scheduling identifier, it is determined that the data transmitted in the HARQ process indicated by the first DCI is retransmission data, in response to the HARQ process number in the first DCI being identical to the HARQ process number in the third DCI and the value of NDI in the first DCI being identical to the value of NDI in the third DCI. A time different between a reception moment of the third DCI and the reception moment of the first DCI is minimum among DCIs corresponding to the broadcast or multicast scheduling identifier or a unicast scheduling identifier.

For example, the terminal device receives a DCI of a PDCCH indicated by a G-RNTI-1 at the moment t1, the HARQ process number in the DCI is 1, and the value of NDI in the DCI is 0. The terminal device receives a DCI of a PDCCH indicated by a C-RNTI-1 at the moment t2, the HARQ process number in the DCI is 1, and the value of NDI in the DCI is 1. After that, the terminal device receives a first DCI of a PDCCH indicated by a G-RNTI-1 at the moment t3, the HARQ process number in the first DCI is 1, and the value of NDI in the first DCI is 0. It can be seen by comparison that the PDCCH corresponding to the DCI received by the terminal device at the moment t1 is the same as the PDCCH corresponding to the first DCI, and the HARQ process numbers in these DCIs are identical. The DCI received at the moment t1 is the above-mentioned "third DCI". Since the value of NDI in the first DCI is identical to the value of NDI in the third DCI, it can be determined that the first DCI indicates that the data transmitted in the HARQ process 1 is the retransmission data.

Or, the terminal device receives a DCI of a PDCCH indicated by a G-RNTI-1 at the moment t1, the HARQ process number in the DCI is 1, and the value of NDI in the DCI is 1. The terminal device receives a DCI of a PDCCH indicated by a C-RNTI-1 at the moment t2, the HARQ process number in the DCI is 1, and the value of NDI in the DCI is 0. After that, the terminal device receives a first DCI of a PDCCH indicated by a G-RNTI-1 at the moment t3, the HARQ process number in the first DCI is 1, and the value of NDI in the first DCI is 0. It can be seen by comparison that the DCI received by the terminal device at the moment t2 is a DCI with the unicast scheduling identifier, while the first DCI is a DCI with the broadcast or multicast scheduling identifier, and the HARQ process number of the DCI received at the moment t2 is the same as the HARQ process number of the first DCI. The DCI received at the moment t2 is the above-mentioned "third DCI". Since the value of NDI in the first DCI is 0 is identical to the value of NDI in the third DCI, it can be determined that the first DCI indicates that the data transmitted in the HARQ process 1 is the retransmission data.

It is noteworthy that the above HARQ process number, the value of NDI, and the like are merely schematic illustrations and cannot be used as a limitation on the HARQ process number, the value of NDI, and the determination of the type of the data transmitted in the HARQ process indicated by the first DCI, and the like, in the embodiments of the disclosure.

In some embodiments of the disclosure, the terminal device may receive the first DCI sent by the network device. The identifier of the PDCCH corresponding to the first DCI is the broadcast or multicast scheduling identifier. The type of the data transmitted in the HARQ process indicated by the first DCI is determined based on the HARQ process number and the value of NDI in the third DCI that a time difference between a reception moment of the third DCI and a reception moment of the first DCI is the minimum among DCIs corresponding to the broadcast or multicast scheduling identifier or a unicast scheduling identifier, as well as the HARQ process number and the value of NDI in the first DCI. Therefore, the terminal device can accurately determine the type of the transmitted data, so that the terminal device and the network device have a consistent understanding of data transmission indication, which effectively avoids data loss and improves the reliability of data transmission.

As illustrated in FIG. 5, FIG. 5 is a flowchart of a method for processing data reception according to an embodiment of the disclosure. The method is performed by a terminal device. As illustrated in FIG. 5, the method may include, but is not limited to, the following.

At step 51, a first DCI sent by a network device is received, in which the first DCI is configured to indicate data transmission in a HARQ process.

In some examples, the contents included in the first DCI include at least one of: a value of NDI or a HARQ process number.

It is noteworthy that the specific content, such as the value of NDI and the HARQ process number, and implementation form can be referred to various other embodiments of the disclosure and will not be repeated herein.

At step 52, when the identifier of the PDCCH corresponding to the first DCI is the broadcast or multicast scheduling identifier, it is determined that the data transmitted in the HARQ process indicated by the first DCI is new transmission data, in response to the HARQ process number in the first DCI being identical to a HARQ process number in a fourth DCI, and the value of NDI in the first DCI being different from a value of NDI in the fourth DCI, in which a fourth DCI has a smallest time difference of a reception moment among DCIs each corresponding to a different PDCCH from the first DCI and corresponding to the broadcast or multicast scheduling identifier.

It is noteworthy that the specific content and the implementation form of the PDCCH identifier, the unicast scheduling identifier or the broadcast or multicast scheduling identifier can be referred to various other embodiments of the disclosure and will not be repeated herein.

For example, the terminal device receives a DCI of a PDCCH indicated by a G-RNTI-2 at the moment t1, the HARQ process number in the DCI is 1, and the value of NDI in the DCI is 1. The terminal device receives a DCI of a PDCCH indicated by a C-RNTI-1 at the moment t2, the HARQ process number in the DCI is 1, and the value of NDI in the DCI is 1. After that, the terminal device receives a first DCI of a PDCCH indicated by a G-RNTI-1 at the moment t3, the HARQ process number in the first DCI is 1, and the value of NDI in the first DCI is 0. It can be seen by comparison that the identifier of the PDCCH corresponding to the DCI received by the terminal device at the moment t1 is the same as the identifier of the PDCCH corresponding to the first DCI, both of which are the broadcast or multicast scheduling identifier. However, the PDCCH corresponding to the DCI received by the terminal device at the moment t1 is different from the PDCCH corresponding to the first DCI, and the HARQ process numbers in these DCIs are the same. The DCI received at the moment t1 is the above-mentioned "fourth DCI". Since the value of NDI in the first DCI is 0, and the value of NDI in the fourth DCI is 1, i.e., these two values of NDI are different, it can be determined that the first DCI indicates that the data transmitted in the HARQ process 1 is the new transmission data.

It is noteworthy that the above HARQ process number, the value of NDI, and the like are merely schematic illustrations and cannot be used as a limitation on the HARQ process number, the value of NDI, and the determination of the type of the data transmitted in the HARQ process indicated by the first DCI, and the like, in the embodiments of the disclosure.

In some examples, when the identifier of the PDCCH corresponding to the first DCI is the broadcast or multicast scheduling identifier, it is determined that the data transmitted in the HARQ process indicated by the first DCI is retransmission data, in response to the HARQ process number in the first DCI being identical to the HARQ process number in the fourth DCI, and the value of NDI in the first DCI being identical to the value of NDI in the fourth DCI, in which a fourth DCI has a smallest time difference of a reception moment among DCIs each corresponding to a different PDCCH from the first DCI and corresponding to the broadcast or multicast scheduling identifier.

For example, the terminal device receives a DCI of a PDCCH indicated by a G-RNTI-2 at the moment t1, the HARQ process number in the DCI is 1, and the value of NDI in the DCI is 0. The terminal device receives a DCI of a PDCCH indicated by a C-RNTI-1 at the moment t2, the HARQ process number in the DCI is 1, and the value of NDI in the DCI is 1. After that, the terminal device receives a first DCI of a PDCCH indicated by a G-RNTI-1 at the moment t3, the HARQ process number in the first DCI is 1, and the value of NDI in the first DCI is 0. It can be seen by comparison that the identifier of the PDCCH corresponding to the DCI received by the terminal device at the moment t1 is the same as the identifier of the PDCCH corresponding to the first DCI, both of them are the broadcast or multicast scheduling identifier. However, the PDCCH corresponding to the fourth DCI is different from the PDCCH corresponding to the first DCI, and the HARQ process numbers in these DCIs are the same. The DCI received at the moment t1 is the above-mentioned "fourth DCI". Since the value of NDI in the first DCI is the same as the value of NDI in the fourth DCI, it can be determined that the first DCI indicates that the data transmitted in the HARQ process 1 is the retransmission data.

It is noteworthy that the above HARQ process number, the value of NDI, and the like are merely schematic illustrations and cannot be used as a limitation on the HARQ process number, the value of NDI, and the determination of the type of the data transmitted in the HARQ process indicated by the first DCI, and the like, in the embodiments of the disclosure.

In some embodiments of the disclosure, the terminal device may receive the first DCI sent by the network device. The identifier of the PDCCH corresponding to the first DCI is the broadcast or multicast scheduling identifier. The type of the data transmitted in the HARQ process indicated by the first DCI is determined based on the HARQ process number and the value of NDI in the fourth DCI having a smallest time difference of a reception moment among DCIs each corresponding to a different PDCCH from the first DCI and corresponding to the broadcast or multicast scheduling identifier, as well as the HARQ process number and the value of NDI in the first DCI. Therefore, the terminal device can accurately determine the type of the transmitted data, so that the terminal device and the network device have a consistent understanding of data transmission indication, which effectively avoids data loss and improves the reliability of data transmission.

As illustrated in FIG. 6, FIG. 6 is a flowchart of a method for processing data reception according to an embodiment of the disclosure. The method is performed by a terminal device. As illustrated in FIG. 6, the method may include, but is not limited to, the following.

At step 61, a first DCI sent by a network device is received, in which the first DCI is configured to indicate data transmission in a HARQ process.

In some examples, the contents included in the first DCI include at least one of: a value of NDI or a HARQ process number.

It is noteworthy that the content, such as the value of NDI and the HARQ process number, and the specific implementation form can be referred to various other embodiments of the disclosure and will not be repeated herein.

At step 62, when the identifier of the PDCCH corresponding to the first DCI is the broadcast or multicast scheduling identifier, it is determined that the data transmitted in the HARQ process indicated by the first DCI is the new transmission data, in response to the HARQ process number in the first DCI being identical to a HARQ process number in a fifth DCI, in which the fifth DCI has a smallest time difference of a reception moment among DCIs each corresponding to a different PDCCH from the first DCI and corresponding to the broadcast or multicast scheduling identifier or a unicast scheduling identifier.

It is noteworthy that the specific content and the implementation form of the PDCCH identifier, the unicast scheduling identifier and the broadcast or multicast scheduling identifier can be referred to various other embodiments of the disclosure and will not be repeated herein.

For example, the terminal device receives a DCI of a PDCCH indicated by a G-RNTI-2 at the moment t1, and the HARQ process number in the DCI is 1. After that, the terminal device receives a first DCI of a PDCCH indicated by a G-RNTI-1 at the moment t2, and the HARQ process number in the first DCI is 1. It can be seen by comparison that the identifier of the PDCCH corresponding to the DCI received by the terminal device at the moment t1 is the same as the identifier of the PDCCH corresponding to the first DCI, both of which are the broadcast or multicast scheduling identifier. However, the PDCCH corresponding to the DCI received at the moment t1 is different from the PDCCH corresponding to the first DCI, and the HARQ process numbers in these DCIs are the same. The DCI received at the moment t1 is the above-mentioned "fifth DCI", and it can be determined that the first DCI indicates that the data transmitted in the HARQ process 1 is the new transmission data.

Or, the terminal device receives a DCI of a PDCCH indicated by a C-RNTI-2 at the moment t1, and the HARQ process number in the DCI is 1. After that, the terminal device receives a first DCI of a PDCCH indicated by a G-RNTI-1 at the moment t2, and the HARQ process number in the first DCI is 1. It can be seen by comparison that the identifier of the PDCCH corresponding to the DCI received by the terminal device at the moment t1 is the unicast scheduling identifier, while the identifier of the PDCCH corresponding to the first DCI is the broadcast or multicast scheduling identifier, i.e., these identifiers are different, and the HARQ process numbers in these DCIs are the same. The DCI received at the moment t1 is the above-mentioned "fifth DCI", and it can be determined that the first DCI indicates that the data transmitted in the HARQ process 1 is the new transmission data.

It is noteworthy that the above HARQ process number, the value of NDI, and the like are merely schematic illustrations and cannot be used as a limitation on the HARQ process number, the value of NDI, and the determination of the type of the data transmitted in the HARQ process indicated by the first DCI, and the like, in the embodiments of the disclosure.

In some embodiments of the disclosure, the terminal device may receive the first DCI sent by the network device, and when the identifier of the PDCCH corresponding to the first DCI is the broadcast or multicast scheduling identifier, it may be determined, based on HARQ process number in the fifth DCI having a smallest time difference of a reception moment among DCIs each corresponding to a different PDCCH from the first DCI and corresponding to the broadcast or multicast scheduling identifier or a unicast scheduling identifier, as well as the HARQ process number in the first DCI, the data transmitted in the HARQ process indicated by the first DCI is the new transmission data. Therefore, the terminal device can accurately determine the type of the transmitted data, so that the terminal device and the network device have a consistent understanding of data transmission indication, which effectively avoids data loss and improves the reliability of data transmission.

As illustrated in FIG. 7, FIG. 7 is a flowchart of a method for processing data reception according to an embodiment of the disclosure. The method is performed by a terminal device. As illustrated in FIG. 7, the method may include, but is not limited to, the following.

At step 71, a first DCI sent by a network device is received, in which the first DCI is configured to indicate data transmission in a HARQ process.

In some examples, the contents included in the first DCI include at least one of: a value of NDI or a HARQ process number.

It is noteworthy that the content, such as the value of NDI and the HARQ process number, and the specific implementation form can be referred to various other embodiments of the disclosure and will not be repeated herein.

At step 72, receiving the first data is abandoned, in response to first data indicated by the first DCI being retransmission data corresponding to any historical data that has been overwritten or cleared.

For example, the terminal device receives a DCI indicated by a PDCCH of a G-RNTI-1 at the moment t1, and the DCI indicates the data transmission in the HARQ process 1. The terminal device receives a DCI indicated by a PDCCH of a C-RNTI-1 at the moment t2, and the DCI indicates the new transmission data in the HARQ process 1. The terminal device receives a first DCI indicated by a PDCCH of a G-RNTI-1 at the moment t3, and the first DCI indicates that the HARQ process 1 retransmits the data scheduled at the moment t1. That is, the first data received at the moment t3 is the retransmission data corresponding to the historical data at the moment t1, and the historical data has been overwritten at the moment t2. In order to enable the terminal device and the network device to have a consistent understanding of data transmission indication, and to ensure the reliability of data transmission, the terminal device can abandon receiving the first data at the moment t3.

In some embodiments of the disclosure, the terminal device may receive the first DCI sent by the network device. After that, if the first data indicated by the first DCI is retransmission data corresponding to any historical data that has been overwritten or cleared, the terminal device may abandon receiving the first data. Therefore, the terminal device can accurately determine the type of the transmitted data, so that the terminal device and the network device have a consistent understanding of data transmission indication, which effectively avoids data loss and improves the reliability of data transmission.

As illustrated in FIG. 8, FIG. 8 is a flowchart of a method for processing data reception according to an embodiment of the disclosure. The method is performed by a terminal device. As illustrated in FIG. 8, the method may include, but is not limited to, the following.

At step 81, a first DCI sent by a network device is received, in which the first DCI is configured to indicate that indicate retransmission data corresponding to any historical data in the HARQ process.

In some examples, the contents included in the first DCI include at least one of: a value of NDI or a HARQ process number.

It is noteworthy that the content, such as the value of NDI and the HARQ process number, and the specific implementation form can be referred to various other embodiments of the disclosure and will not be repeated herein.

At step 82, receiving the first data is abandoned, in response to a sending moment of the first data indicated by the first DCI being after a sending moment of second data indicated by sixth DCI, in which a HARQ process number in the sixth DCI is identical to the HARQ process number in the first DCI.

For example, the terminal device receives a DCI of a PDCCH indicated by a the G-RNTI-1 at the moment t1, the DCI indicates data transmission in the HARQ process 1. The terminal device receives a DCI of a PDCCH indicated by a C-RNTI-1 at the moment t2, and the DCI indicates that new transmission data is transmitted at the moment t3 in the HARQ process 1. The terminal device may also receive the first DCI of a PDCCH indicated by a G-RNTI-1 at the moment t2, and the DCI indicates that the HARQ process 1 retransmits, at the moment t4, the data scheduled at the moment t1, i.e., the sending moment of the first data indicated by the first DCI is t4. It can be seen by comparison that the HARQ process number of the DCI received by the terminal device at the moment t2 is the same as the HARQ process number of the first DCI. The DCI received at the moment t2 is the above-mentioned "sixth DCI". Since the sending moment of the second data indicated by the sixth DCI is t3 and t4 is after t3, the terminal device may abandon receiving the first data at the moment t4.

It is noteworthy that the above examples are merely illustrative and cannot be taken as limiting the first data and the sending moment of the first data indicated by the first DCI, the second data and the sending moment of the second data indicated by the sixth DCI in the embodiments of the disclosure.

In some embodiments, the terminal device may also abandon receiving the first data in the case where the sending moment of the first DCI is after the sending moment of the sixth DCI, in which the HARQ process number in the sixth DCI is the same as the HARQ process number in the first DCI.

For example, the terminal device receives a DCI of a PDCCH indicated by the G-RNTI-1 at the moment t1, the DCI indicates data transmission in the HARQ process 1. The terminal device receives a DCI of a PDCCH indicated by a C-RNTI at the moment t2, and the DCI indicates new transmission data in the HARQ process 1. The terminal device receives a first DCI of a PDCCH indicated the G-RNTI-1 at the moment t3, and the first DCI indicates that the HARQ process 1 retransmits the data scheduled at the moment t1. By comparison, it can be seen that the HARQ process number of the DCI received by the terminal device at the moment t2 is the same as the HARQ process number of the first DCI. The DCI received at the moment t2 is the above-mentioned "sixth DCI". Since the sending moment of the sixth DCI is t2 and the sending moment of the first DCI is t3 after t2, the terminal device can abandon receiving the first data at the moment t3.

It is noteworthy that the above examples are merely illustrative and cannot be taken as limiting the first data and the sending moment of the first data indicated by the first DCI, the second data and the sending moment of the second data indicated by the sixth DCI in the embodiments of the disclosure.

In some embodiments of the disclosure, the terminal device may receive the first DCI sent by the network device, and the first data indicated by the first DCI may be retransmission data corresponding to any historical data. If the sending moment of the first data indicated by the first DCI is after the sending moment of the second data indicated by the sixth DCI, the terminal device abandons receiving the first data.

Therefore, the terminal device and the network device can have a consistent understanding of data transmission indication, which effectively avoids data loss and improves the reliability of data transmission.

As illustrated in FIG. 9, FIG. 9 is a flowchart of a method for processing data reception according to an embodiment of the disclosure. The method is performed by a terminal device. As illustrated in FIG. 9, the method may include, but is not limited to, the following.

At step 91, a first DCI sent by a network device is received, in which the first DCI is configured to indicate retransmission data corresponding to any historical data in the HARQ process.

In some examples, the contents included in the first DCI include at least one of: a value of NDI or a HARQ process number.

It is noteworthy that the content, such as the value of NDI and the HARQ process number, and the specific implementation form can be referred to various other embodiments of the disclosure and will not be repeated herein.

At step 92, a first specified rule sent by the network device is received.

In some examples, the first specified rule includes any one of: new transmission data of a unicast scheduling having a higher reception priority than retransmission data of a multicast scheduling; or the retransmission data having a higher reception priority than the new transmission data; or being based on a priority of interest of the terminal device.

In some examples, there can be multiple first specified rules, the terminal device can perform subsequent processing based on the multiple rules if these first specified rules do not conflict with each other.

It is understandable that if the terminal device receives multiple first specified rules sent by the network device, and some of the first specified rules conflict with each other, the terminal device may first determine priorities of these first specified rules base on the network device configuration or based on the protocol agreement, so that the terminal device may carry out subsequent processing based on the priorities of these rules.

In some examples, the first specified rule can be determined based on the protocol agreement, which is not limited in the disclosure.

In the disclosure, the step 91 and the step 92 may be performed in parallel, or the step 91 may be performed before the step 92, or the step 92 may be performed before the step 91, which is not limited in the disclosure.

At step 93, reception priorities of the first data and the second data are determined based on the first specified rule, in response to the sending moment of the first data indicated by the first DCI being at least partially overlapped with the sending moment of the second data indicated by the sixth DCI, in which a HARQ process number in the sixth DCI is identical to the HARQ process number in the first DCI.

In some examples, the first specified rule is that the new transmission data of the unicast scheduling has a higher reception priority than the retransmission data of the multicast scheduling. When the first data indicated by the first DCI is the retransmission data of the multicast scheduling, and the second data indicated by the sixth DCI is the new transmission data of the unicast scheduling, if the sending moment of the first data indicated by the first DCI is at least partially overlapped with the sending moment of the second data indicated by the sixth DCI, the terminal device determines that the reception priority of the second data is higher than the reception priority of the first data based on the first specified rule indicating that the new transmission data of the unicast scheduling has a higher reception priority than the retransmission data of the multicast scheduling.

In some examples, the first specified rule is that the retransmission data has a higher reception priority than the new transmission data. When the first data indicated by the first DCI is the retransmission data and the second data indicated by the sixth DCI is the new transmission data, if the sending moment of the first data indicated by the first DCI is partially overlapped with the sending moment of the second data indicated by the sixth DCI, the terminal device determines that the reception priority of the first data is higher than the reception priority of the second data based on the first specified rule indicating that the retransmission data has a higher reception priority than the new transmission data.

In some examples, the first specified rule is based on the priority of interest of the terminal device. For example, the terminal device can receive retransmission data of the unicast scheduling firstly before receiving the new transmission data of the multicast scheduling. When the first data indicated by the first DCI is the retransmission data of the unicast scheduling, and the second data indicated by the sixth DCI is the new transmission data of the multicast scheduling, if the sending moment of the first data indicated by the first DCI is partially overlapped with the sending moment of the second data indicated by the sixth DCI, the terminal device determines that the reception priority of the first data is higher than the reception priority of the second data based on the priority of interest of the terminal device.

It is noteworthy that the above examples are merely illustrative and cannot be taken as a limitation of the first specified rule, the first data, the second data, and the like in the embodiments of the disclosure.

In some embodiments of the disclosure, the terminal device may receive the first DCI sent by the network device, and the first DCI is configured to indicate retransmission data corresponding to any historical data in the HARQ process. In the case that the first data indicated by the first DCI is the retransmission data corresponding to any historical data and the sending moment of the first data is at least partially overlapped with the sending moment of the second data indicated by the sixth DCI, the reception priorities of the first data and the second data are determined based on the first specified rule, in which the HARQ process number in the sixth DCI is identical to the HARQ process number in the first DCI. Therefore, the terminal device and the network device have a consistent understanding of data transmission indication, which effectively avoids data loss and improves the reliability of data transmission.

As illustrated in FIG. 10, FIG. 10 is a flowchart of a method for processing data reception according to an embodiment of the disclosure. The method is performed by a terminal device. As illustrated in FIG. 10, the method may include, but is not limited to, the following.

At step 101, receiving the first data indicated by the first DCI is abandoned, in response to a sending moment of the first DCI being after a sending moment of seventh DCI.

For example, the network device sends a first DCI of a PDCCH indicated by a G-RNTI-1 at the moment t1, in which the first data indicated by the first DCI is the new transmission data. The network device sends a seventh DCI of a PDCCH indicated by a C-RNTI-1 at the moment t2, and t1 is after t2. Then the terminal device may abandon receiving the first data indicated by the first DCI.

It is noteworthy that the above examples are merely illustrative and cannot be taken as limiting the first data and the sending moment of the first data indicated by the first DCI, the sending moment of the seventh DCI, and the like in the embodiments of the disclosure.

In some examples, the terminal device may also determine the reception priorities of the first data and the third data indicated by the seventh DCI base on the configuration information sent by the network device.

For example, the configuration information received by the terminal device and sent by the network device can be: the reception priority of the new transmission data being higher than the reception priority of the retransmission data. If the type of the first data indicated by the first DCI is the new transmission data, and the type of the third data indicated by the seventh DCI is the retransmission data, then the terminal device can determine that the reception priority of the first data is higher than the reception priority of the third data based on the received configuration information.

It is noteworthy that the above examples are merely illustrative and cannot be taken as a limitation of the first data indicated by the first DCI, the third data indicated by the seventh DCI, and the like in the embodiments of the disclosure.

In some examples, the terminal device may further determine the reception priority of the first data and the reception priority of the third data indicated by the seventh DCI based on a second specified rule.

The second specified rule may be sent by the network device to the terminal device, or may be determined by the terminal device based on the protocol agreement, which is not limited in the disclosure.

In some examples, the second specified rule includes any one of: the new transmission data of the unicast scheduling having a higher reception priority than the retransmission data of the multicast scheduling; or being based on a priority of interest of the terminal device.

In some examples, the second specified rule is that the new transmission data of the unicast scheduling has a higher reception priority than the retransmission data of the multicast scheduling. When the type of the first data indicated by the first DCI is the new transmission data of the unicast scheduling and the type of the third data indicated by the seventh DCI is the new transmission data of the unicast scheduling, the terminal device can determine that the reception priority of the third data indicated by the seventh DCI is higher than the reception priority of the first data indicated by the first DCI based on the second specified rule.

In some examples, the second specified rule is being based on the priority of interest of the terminal device. For example, the terminal device can receive the new transmission data of the multicast scheduling before receiving the new transmission data of the unicast scheduling. When the first data indicated by the first DCI is the new transmission data of the unicast scheduling and the third data indicated by the seventh DCI is the new transmission data of the multicast scheduling, the terminal device can determine that the reception priority of the third data indicated by the seventh DCI is higher than the reception priority of the first data indicated by the first DCI based on the second specified rule.

It is noteworthy that the above examples are merely illustrative and cannot be taken as a limitation of the first data indicated by the first DCI, the third data indicated by the seventh DCI, and the like in the embodiments of the disclosure.

At step 102, feedback information is sent to the network device, in response to determining that the terminal device abandons receiving the data transmitted in the HARQ process indicated by the first DCI, in which the feedback information is configured to indicate, to the network device, a reception failure of the data transmitted in the HARQ process indicated by the first DCI.

For example, if the terminal device abandons receiving the data transmitted in the HARQ process 1 indicated by the first DCI, the terminal device can send, to the network device, the feedback information indicating that the reception of the data transmitted in the HARQ process 1 indicated by the first DCI has failed, which is not limited in the disclosure.

In some examples, in order to save network resources, the terminal device may also abandon sending the feedback information to the network device after abandoning receiving the data transmitted in the HARQ process indicated by the first DCI.

For example, if the terminal device abandons receiving the data transmitted in the HARQ process 2 indicated by the first DCI, the terminal device may abandon sending, to the network device, the feedback information that the reception of the data transmitted in the HARQ process 2 indicated by the first DCI has failed, which is not limited in the disclosure.

In some embodiments of the disclosure, in the case where the sending moment of the first DCI is after the sending moment of the seventh DCI, the terminal device may abandon receiving the first data indicated by the first DCI. After that, the terminal device can send, to the network device, the feedback information that the reception of the data transmitted in the HARQ process indicated by the first DCI has failed. Therefore, the terminal device and the network device have a consistent understanding of data transmission indication, which effectively avoids data loss and improves the reliability of data transmission.

As illustrated in FIG. 11, FIG. 11 is a flowchart of a method for processing data reception according to an embodiment of the disclosure. The method is performed by a network device. As illustrated in FIG. 11, the method may include, but is not limited to, the following.

At step 111, a type of a first DCI corresponding to a HARQ process and contents included in the first DCI are determined based on a type of data to be transmitted, in response to determining the data to be transmitted in the HARQ process.

In some examples, the type of the first DCI is determined based on the RNTI corresponding to the first DCI.

It is noteworthy that the type of the first DCI and the specific implementation form of determining the type of the first DCI can be described with reference to the description of various other embodiments of the disclosure and will not be repeated herein.

In some examples, the contents included in the first DCI include at least one of the followings: a value of NDI or a HARQ process number.

It is noteworthy that the contents included in the first DCI and the specific implementation form thereof can be referred to the description of various other embodiments of the disclosure and will not be repeated herein.

In detail, when the network device determines that there is new transmission data in the HARQ process 1 of the DCI of the PDCCH indicated by the G-RNTI-1 at the moment t3, the network device may determine that the type of the first DCI corresponding to the HARQ process 1 is the PDCCH indicated by the G-RNTI-1. After that, the network device may determine the value of NDI corresponding to the HARQ process 1 in the DCI of the PDCCH indicated by the G-RNTI-1 at the moment t3, based on the value of NDI corresponding to the HARQ process 1 in the DCI of the PDCCH indicated by the G-RNTI-1 at each moment before t3.

For example, if the value of NDI corresponding to the HARQ process 1 in the DCI of the PDCCH indicated by the G-RNTI-1 sent at the moment t2 is 1, data indicated by the DCI at the moment t2 is the retransmission data, and the data to be transmitted at the moment t3 is the new transmission data, then the network device can determine that the value of NDI corresponding to the HARQ process 1 in the DCI of the PDCCH indicated by the G-RNTI-1 at the moment t3 is 0.

Or, when the network device determines that there is retransmission data in the HARQ process 1 in the DCI of the PDCCH indicated by the G-RNTI-1 at the moment t3, the network device may determine that the type of the first DCI corresponding to the HARQ process 1 is the PDCCH indicated by the G-RNTI-1. After that, the network device may determine the value of NDI corresponding to the HARQ process 1 in the DCI of the PDCCH indicated by the G-RNTI-1 at the moment t3, based on the value of NDI corresponding to the HARQ process 1 in the DCI of the PDCCH indicated by the G-RNTI-1 at each moment before t3.

For example, if the value of NDI corresponding to the HARQ process 1 in the DCI of the PDCCH indicated by the G-RNTI-1 at the moment t2 is 1, data indicated by the DCI at the moment t2 is the retransmission data, and the data to be transmitted at the moment t3 is the retransmission data, then the network device can determine that the value of NDI corresponding to the HARQ process 1 in the DCI of the PDCCH indicated by the G-RNTI-1 at the moment t3 is 1.

It is noteworthy that the above examples are merely illustrative and cannot be taken as a limitation of the type of data to be transmitted, the type of the first DCI, and the contents included in the first DCI in the embodiments of the disclosure.

It is noteworthy that the specific implementation form of the network device determining the type of the first DCI corresponding to the HARQ process and the contents included in the first DCI based on the type of data to be transmitted, can be achieved by performing a reverse operation thereon with reference to the manner in which the terminal device determines the type of data transmitted in the HARQ process based on the type of the first DCI and the contents included in the first DCI in other embodiments of the disclosure, which will not be repeated herein.

At step 112, the first DCI is sent to a terminal device, in which the first DCI is configured to indicate data transmission in the HARQ process.

It is understandable that after determining the type of the first DCI corresponding to the HARQ process and the contents included in the first DCI, the network device may send the first DCI to the terminal device, so that the terminal device may determine the type of the data transmitted in the HARQ process based on the first DCI. As a result, the terminal device and the network device can be made to have a consistent understanding of the data transmission instructions, which can reduce data loss and improve the reliability of the data transmission.

In some embodiments of the disclosure, when there is data transmission in the HARQ process, the network device may determine the type of the first DCI corresponding to the HARQ process and the contents included in the first DCI based on the type of the data to be transmitted, and send the first DCI to the terminal device. The first DCI is used to indicate data transmission in the HARQ process. Therefore, the terminal device and the network device have a consistent understanding of data transmission indication, which effectively avoids data loss and improves the reliability of data transmission.

As illustrated in FIG. 12, FIG. 12 is a flowchart of a method for processing data reception according to an embodiment of the disclosure. The method is performed by a network device. As illustrated in FIG. 12, the method may include, but is not limited to, the following.

At step 121, a first specified rule is sent to the terminal device, in which the first specified rule is configured to indicate, to the terminal device, reception priorities of new transmission data and retransmission data transmitted based on the same HARQ process.

In some examples, the first specified rule includes any one of: the new transmission data of the unicast scheduling having a higher reception priority than the retransmission data of the multicast scheduling; or the retransmission data having a higher reception priority than the new transmission data; or being based on a priority of interest of the terminal device.

It is noteworthy that the operations performed by the terminal device based on the first specified rule and corresponding effects in the disclosure can be described with reference to the description of various other embodiments of the disclosure, and will not be repeated herein.

At step 122, a second specified rule is sent to the terminal device, in which the second specified rule is configured to indicate, to the terminal device, reception priorities of multiple pieces of new transmission data transmitted based on the same HARQ process.

In some examples, the second specified rule includes any one of: the new transmission data of the unicast scheduling having a higher reception priority than the retransmission data of the multicast scheduling; or being based on a priority of interest of the terminal device.

It is noteworthy that the operations performed by the terminal device based on the second specified rule and corresponding effects in the disclosure can be described with reference to the description of various other embodiments of the disclosure, and will not be repeated herein.

At step 123, a type of first DCI corresponding to the HARQ process and contents included in the first DCI are determined based on a type of data to be transmitted, in response to determining the data to be transmitted in a HARQ process.

In some examples, the type of the first DCI can be determined based on the RNTI corresponding to the first DCI.

It is noteworthy that the type of the first DCI and the specific implementation form of determining the type of the first DCI can be described with reference to the description of various other embodiments of the disclosure and will not be repeated herein.

In some examples, the contents included in the first DCI include at least one of: a value of NDI or a HARQ process number.

It is noteworthy that the contents included in the first DCI and the specific implementation form can be described with reference to the description of various other embodiments of the disclosure and will not be repeated herein.

In the disclosure, step 121, step 122 and step 123 may be performed in parallel, or in the order of step 121, step 122 and step 123, or in the order of step 123, step 121 and step 122, which is not limited in the disclosure.

At step 124, the first DCI is sent to a terminal device, in which the first DCI is configured to indicate data transmission in the HARQ process.

In some embodiments of the disclosure, the network device may send the first specified rule and the second specified rule to the terminal device, so that the terminal device may receive data in an orderly manner. The network device may also, when there is data transmission in the HARQ process, determine the type of the first DCI corresponding to the HARQ process and the contents included in the first DCI based on the type of the data to be transmitted, and send the first DCI to the terminal device. Therefore, the terminal device and the network device have a consistent understanding of data transmission indication, which effectively avoids data loss and improves the reliability of data transmission.

In the above-described embodiments provided in the disclosure, the methods according to the embodiments of the disclosure are described from the perspectives of a network device and a terminal device, respectively. In order to realize each of the functions in the methods according to the above embodiments of the disclosure, the network device and the terminal device may include a hardware structure and a software module, to realize each of the above functions in the form of hardware structure, software module, or a combination of hardware structure and software module. A function of each of the above functions may be performed in the form of hardware structure, software module, or a combination of hardware structure and software module.

As illustrated in FIG. 13, FIG. 13 is a schematic diagram of a communication apparatus 130 according to an embodiment of the disclosure. The communication apparatus 130 illustrated in FIG. 13 may include a transceiver module 1301 and a processing module 1302.

The transceiver module 1301 may include a transmitting module and/or a receiving module. The transmitting module is configured to realize a transmitting function, and the receiving module is configured to realize a receiving function. The transceiver module 1301 may realize the transmitting function and/or the receiving function.

The communication apparatus 130 is a terminal device.

The transceiver module 1301 is configured to receive a first DCI sent by a network device, in which the first DCI is configured to indicate data transmission in a HARQ process.

The processing module 1302 is configured to determine a type of data transmitted in the HARQ process indicated by the first DCI based on a type of the first DCI and contents included in the first DCI, in response to an identifier of a PDCCH corresponding to the first DCI as a broadcast or multicast scheduling identifier.

In some examples, the processing module 1302 is further configured to: determine the type of the first DCI based on a RNTI corresponding to the first DCI.

In some examples, the contents included in the first DCI include at least one of: a value of NDI or a HARQ process number.

In some examples, the processing module 1302 is further configured to:

determine that the data transmitted in the HARQ process indicated by the first DCI is new transmission data, in response to the HARQ process number in the first DCI being identical to a HARQ process number in a second DCI, and the value of NDI in the first DCI being different from a value of NDI in the second DCI;

or, determine that the data transmitted in the HARQ process indicated by the first DCI is retransmission data, in response to the HARQ process number in the first DCI being identical to the HARQ process number in the second DCI, and the value of NDI in the first DCI being identical to the value of NDI in the second DCI;

in which, the second DCI has a smallest time difference of a reception moment among DCIs corresponding to a same PDCCH as the first DCI.

In some examples, the same PDCCH include at least one of: same scheduling identifier information of the PDCCH, or same resource configuration information of the PDCCH.

In some examples, the processing module 1302 is further configured to:

determine that the data transmitted in the HARQ process indicated by the first DCI is new transmission data, in response to the HARQ process number in the first DCI being identical to a HARQ process number in a third DCI, and the value of NDI in the first DCI being different from a value of NDI in the third DCI;

or, determine that the data transmitted in the HARQ process indicated by the first DCI is retransmission data, in response to the HARQ process number in the first DCI being identical to the HARQ process number in the third DCI, and the value of NDI in the first DCI being identical to the value of NDI in the third DCI;

in which, a time different between a reception moment of the third DCI and the reception moment of the first DCI is minimum among DCIs corresponding to the broadcast or multicast scheduling identifier or a unicast scheduling identifier.

In some examples, the processing module 1302 is further configured to:

determine that the data transmitted in the HARQ process indicated by the first DCI is new transmission data, in response to the HARQ process number in the first DCI being identical to a HARQ process number in a fourth DCI, and the value of NDI in the first DCI being different from a value of NDI in the fourth DCI;

or, determine that the data transmitted in the HARQ process indicated by the first DCI is retransmission data, in response to the HARQ process number in the first DCI being identical to the HARQ process number in the fourth DCI, and the value of NDI in the first DCI being identical to the value of NDI in the fourth DCI;

in which, a fourth DCI has a smallest time difference of a reception moment among DCIs each corresponding to a different PDCCH from the first DCI and corresponding to the broadcast or multicast scheduling identifier.

In some examples, the processing module 1302 is further configured to:

determine that the data transmitted in the HARQ process indicated by the first DCI is new transmission data, in response to the HARQ process number in the first DCI being identical to a HARQ process number in a fifth DCI;

in which, the fifth DCI has a smallest time difference of a reception moment among DCIs each corresponding to a different PDCCH from the first DCI and corresponding to the broadcast or multicast scheduling identifier or a unicast scheduling identifier.

In some examples, the processing module 1302 is further configured to:

abandon receiving the first data, in response to first data indicated by the first DCI being retransmission data corresponding to any historical data that has been overwritten or cleared.

In some examples, when the first data indicated by the first DCI is retransmission data corresponding to any historical data, the processing module 1302 is further configured to:

abandon receiving the first data, in response to a sending moment of the first data indicated by the first DCI being after a sending moment of second data indicated by sixth DCI;

or, abandon receiving the first data, in response to a sending moment of the first DCI being after a sending moment of the sixth DCI;

or, determine reception priorities of the first data and the second data based on a first specified rule, in response to the sending moment of the first data indicated by the first DCI being at least partially overlapped with the sending moment of the second data indicated by the sixth DCI;

in which a HARQ process number in the sixth DCI is identical to the HARQ process number in the first DCI.

In some examples, the transceiver module 1301 is further configured to receive the first specified rule sent by the network device;

or, the processing module 1302 is further configured to: determine the first specified rule based on a protocol agreement.

In some examples, the first specified rule includes any one of:

The new transmission data of a unicast scheduling having a higher reception priority than the retransmission data of a multicast scheduling; or the retransmission data having a higher reception priority than the new transmission data; or being based on a priority of interest of the terminal device.

In some examples, when the data indicated by the first DCI is new transmission data, the processing module 1302 is further configured to:

abandon receiving the first data indicated by the first DCI, in response to a sending moment of the first DCI being after a sending moment of a seventh DCI;

or, determine reception priorities of the first data and third data indicated by the seventh DCI, based on configuration information sent by the network device;

or, determine the reception priorities of the first data and the third data indicated by the seventh DCI, based on a second specified rule.

In some examples, the second specified rule includes any one of:

the new transmission data of a unicast scheduling having a higher reception priority than the retransmission data of a multicast scheduling; or being based on a priority of interest of the terminal device.

In some examples, the transceiver module 1301 is further configured to: send feedback information to the network device, in response to the terminal device abandoning receiving the data transmitted in the HARQ process indicated by the first DCI in which the feedback information is configured to indicate, to the network device, a reception failure of the data transmitted in the HARQ process indicated by the first DCI;

or, the processing module 1302 is further configured to: abandon sending the feedback information to the network device, in response to the terminal device abandoning receiving the data transmitted in the HARQ process indicated by the first DCI.

With the communication apparatus according to the disclosure, the terminal device may first receive the first DCI sent by the network device, and the first DCI is used to indicate data transmission in the HARQ process. If the identifier of the PDCCH corresponding to the first DCI is the broadcast or multicast scheduling identifier, the type of the data transmitted in the HARQ process indicated by the first DCI is determined based on the type of the first DCI and the contents included in the first DCI. Therefore, the type of the transmitted data can be accurately determined, so that the terminal device and the network device can have a consistent understanding of the data transmission indication, which effectively avoids data loss and improves the reliability of data transmission.

The communication apparatus 130 may be a terminal device, a device in the terminal device, or a device that can be integrated in the terminal device and capable of being used together with the terminal device. Or, the communication apparatus 130 may be a network device, or a device in the network device, or a device that can be integrated in the network device and capable of being used together with the network device.

The communication apparatus 130 may be a network device.

The processing module 1302 is configured to determine a type of first DCI corresponding to the HARQ process and contents included in the first DCI based on a type of data to be transmitted, in response to determining the data to be transmitted in a HARQ process.

The transceiver module 1301 is configured to send the first DCI to a terminal device, in which the first DCI is configured to indicate data transmission in the HARQ process.

In some examples, the processing module 1302 is further configured to: determine the type of the first DCI based on a RNTI corresponding to the first DCI.

In some examples, the contents included in the first DCI include at least one of: a value of NDI or a HARQ process number.

In some examples, the transceiver module 1301 is further configured to:

send a first specified rule to the terminal device, in which the first specified rule is configured to indicate, to the terminal device, reception priorities of new transmission data and retransmission data transmitted based on the same HARQ process.

In some examples, the first specified rule includes any one of: the new transmission data of a unicast scheduling having a higher reception priority than the retransmission data of a multicast scheduling; or the retransmission data having a higher reception priority than the new transmission data; or being based on a priority of interest of the terminal device.

In some examples, the transceiver module 1301 is further configured to: send a second specified rule to the terminal device, in which the second specified rule is configured to indicate, to the terminal device, reception priorities of multiple pieces of new transmission data transmitted based on the same HARQ process.

In some examples, the second specified rule includes any one of: the new transmission data of a unicast scheduling having a higher reception priority than the retransmission data of a multicast scheduling; or being based on a priority of interest of the terminal device.

With the communication apparatus according to the disclosure, when there is data transmission in the HARQ process, the network device determines the type of the first DCI corresponding to the HARQ process and the contents included in the first DCI based on the type of data to be transmitted, and sends the first DCI to the terminal device. The first DCI is configured to indicate data transmission in the HARQ process. Therefore, the terminal device and the network device have a consistent understanding of data transmission indication, which effectively avoids data loss and improves the reliability of data transmission.

Figure 14:
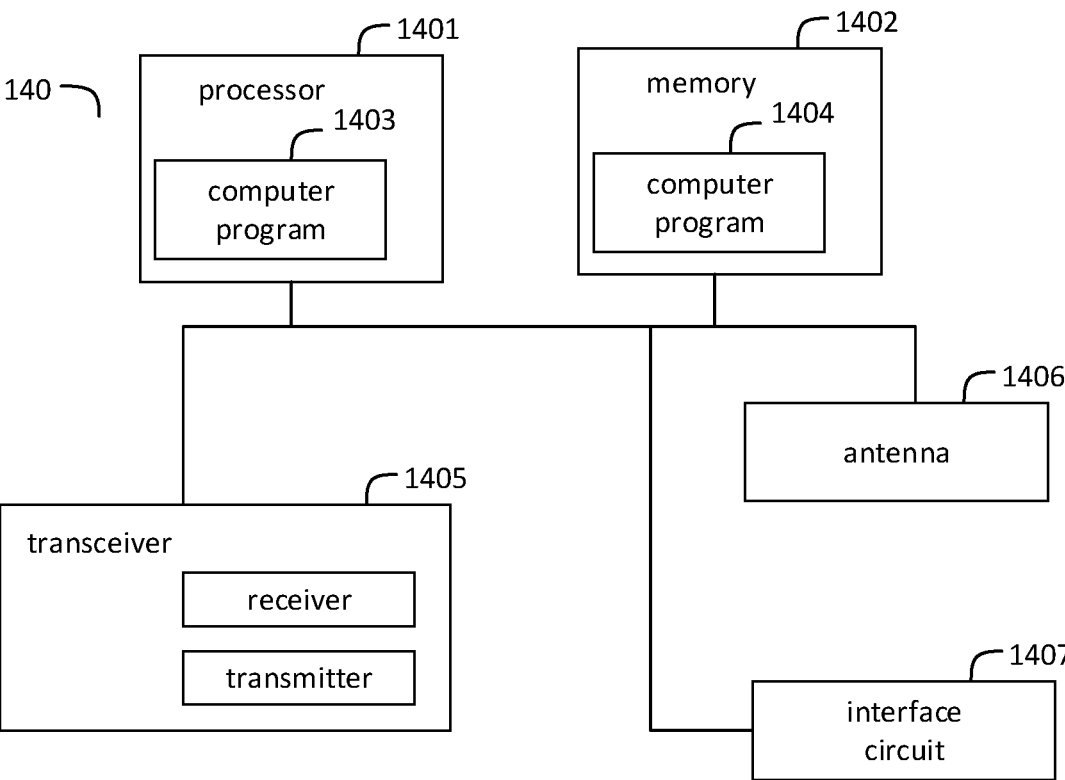
FIG. 14 is a schematic diagram of a communication device according to another embodiment of the disclosure.

As illustrated in FIG. 14, FIG. 14 is a schematic diagram of a communication device 140 according to an embodiment of the disclosure. The communication device 140 may be a network device, a terminal device, or a chip, a chip system or a processor that supports the network device to realize the above-described methods, or a chip, a chip system or a processor that supports the terminal device to realize the above-described methods. The device can be used to realize the methods described in the above method embodiments with reference to the illustration of the above-described method embodiments.

The communication device 140 may include one or more processors 1401. The processor 1401 may be a general purpose processor or a dedicated processor, such as, a baseband processor and a central processor. The baseband processor is used for processing communication protocols and communication data. The central processor is used for controlling the communication device (e.g., base station, baseband chip, terminal device, terminal device chip, DU, or CU), executing a computer program, and processing data of the computer program.

In some examples, the communication device 140 may include one or more memories 1402 on which a computer program 1404 is stored. The processor 1401 executes the computer program 1404 to cause the communication device 140 to perform the methods described in the above method embodiments. In some examples, the memory 1402 may also store data. The communication device 140 and the memory 1402 may be provided separately or may be integrated together.

In some examples, the communication device 140 may also include a transceiver 1405 and an antenna 1406. The transceiver 1405 may be referred to as transceiver unit, transceiver machine, or transceiver circuit, for realizing the transceiver function. The transceiver 1405 may include a receiver and a transmitter. The receiver may be referred to as receiver machine or receiving circuit, for realizing the receiving function. The transmitter may be referred to as transmitter machine or transmitting circuit, for realizing the transmitting function.

In some examples, the communication device 140 may also include one or more interface circuits 1407. The interface circuits 1407 are used to receive code instructions and transmit them to the processor 1401. The processor 1401 runs the code instructions to cause the communication device 140 to perform the methods described in the method embodiments.

The communication device 140 is a terminal device. The processor 1401 is used to perform step S22 in FIG. 2, step S32 in FIG. 3, step S42 in FIG. 4, step S52 in FIG. 5, step S62 in FIG. 6, step S72 in FIG. 7, step S82 in FIG. 8, step S92 in FIG. 9, or step S101 in FIG. 10. The transceiver 1405 is used to perform step S21 in FIG. 2, step S31 in FIG. 3, step S41 in FIG. 4, step S51 in FIG. 5, step S61 in FIG. 6, step S71 in FIG. 7, step S81 in FIG. 8, step S91 in FIG. 9, step S92 in FIG. 9, or step S102 in FIG. 10.

The communication device 140 is a network device. The transceiver 1405 is used to perform step S112 in FIG. 11, step S121 in FIG. 12, step S122 in FIG. 12, or step S124 in FIG. 12. The processor 1401 is used to perform step S111 in FIG. 11, or step S123 in FIG. 12.

In an implementation, the processor 1401 may include a transceiver for implementing the receiving and transmitting functions. The transceiver may be, for example, a transceiver circuit, an interface, or an interface circuit. The transceiver circuit, interface, or interface circuit for implementing the receiving and transmitting functions may be separated or may be integrated together. The transceiver circuit, interface, or interface circuit described above may be used for reading and writing code/data, or may be used for signal transmission or delivery.

In an implementation, the processor 1401 may store a computer program 1403. When the computer program 1403 is performed by the processor 1401, the communication device 140 is caused to perform the methods described in the method embodiments above. The computer programs 1403 may be solidified in the processor 1401, in which case the processor 1401 may be implemented by hardware.

In an implementation, the communication device 140 may include circuits. The circuits may implement the sending, receiving or communicating function in the preceding method embodiments. The processor and transceiver described in this disclosure may be implemented on integrated circuits (ICs), analog ICs, radio frequency integrated circuits (RFICs), mixed signal ICs, application specific integrated circuits (ASICs), printed circuit boards (PCBs), and electronic devices. The processor and transceiver can also be produced using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), and gallium arsenide (GaAs).

The communication device in the above description of embodiments may be a network device or a terminal device, but the scope of the communication device described in the disclosure is not limited thereto, and the structure of the communication device is not limited by FIG. 8. The communication device may be a stand-alone device or may be part of a larger device. For example the communication device may be:

(1) a stand-alone IC, chip, chip system or subsystem;

(2) a collection of ICs consisting of one or more ICs, optionally, the collection of ICs may also include storage components for storing data and computer programs;

(3) an ASIC, such as a modem;

(4) modules that can be embedded within other devices;

(5) receivers, terminal devices, smart terminal devices, cellular phones, wireless devices, handheld machines, mobile units, in-vehicle devices, network devices, cloud devices, artificial intelligence devices, and the like; and (6) others.

Figure 15:
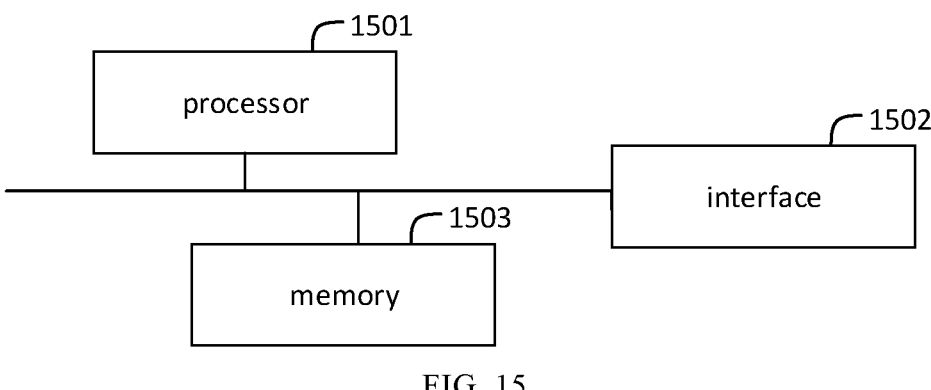
FIG. 15 is a schematic diagram of a chip according to an embodiment of the disclosure.

The case where the communication device may be a chip or a chip system is described with reference to the schematic structure of the chip illustrated in FIG. 15. The chip illustrated in FIG. 15 includes a processor 1501 and an interface 1502. The chip may include one or more processors 1501, and multiple interfaces 1502.

In the case where the chip is used to implement the function of the terminal device in the embodiment of the disclosure, the interface 1502 is used for performing step S21 in FIG. 2, step S31 in FIG. 3, step S41 in FIG. 4, step S51 in FIG. 5, step S61 in FIG. 6, step S71 in FIG. 7, step S81 in FIG. 8, step S91 in FIG. 9, step S92 in FIG. 9, or step S102 in FIG. 10.

In the case where the chip is used to implement the function of the network device in the embodiment of the disclosure, the interface 1502 is used for performing step S112 in FIG. 11, step S121 in FIG. 12, step S122 in FIG. 12, or step S124 in FIG. 12.

In some examples, the chip further includes a memory 1503 used to store a necessary computer program and data.

It is understandable by those skilled in the art that various illustrative logical blocks and steps listed in the embodiments of the disclosure may be implemented by electronic hardware, computer software, or a combination of both. Whether such function is implemented by hardware or software depends on the specific application and the overall system design requirements. Those skilled in the art may, for each specific application, use various methods to implement the described functions, but such implementation should not be understood as beyond the scope of protection of the embodiments of the disclosure.

The embodiments of the disclosure also provide a system for processing data reception. The system includes a communication device as a terminal device and a communication device as a network device in the embodiment of FIG. 13. Or, the system includes a communication device as a terminal device and a communication device as a network device in the embodiments of FIG. 14.

The disclosure also provides a readable storage medium, having instructions stored thereon. When the instructions are executed by a computer, the function of any of the method embodiments described above is implemented.

The disclosure also provides a computer program product. When the computer program product is executed by a computer, the function of any of the method embodiments described above is implemented.

The above embodiments may be implemented in whole or in part by software, hardware, firmware, or any combination thereof. When implemented using software, the above embodiments may be implemented, in whole or in part, in the form of a computer program product. The computer program product includes one or more computer programs. When the computer is loading and executing the computer programs, all or part of processes or functions described in the embodiments of the disclosure are implemented. The computer may be a general-purpose computer, a dedicated computer, a computer network, or other programmable devices. The computer program may be stored in a computer-readable storage medium or transmitted from one computer-readable storage medium to another computer-readable storage medium. For example, the computer programs may be transferred from a website, a computer, a server, or a data center to another web site, computer, server, or data center, in a wired manner (e.g., by using coaxial cables, fiber optics, or digital subscriber lines (DSLs) or wirelessly (e.g., by using infrared wave, wireless wave, or microwave). The computer-readable storage medium may be any usable medium to which the computer has access, a server integrated by one or more usable mediums, or a data storage device such as a data center. The usable medium may be a magnetic medium (e.g., floppy disk, hard disk, and tape), an optical medium (e.g., a high-density digital video disc (DVD)), or a semiconductor medium (e.g., a solid state disk (SSD)).

Those skilled in the art understands that the first, second, and other various numerical numbers involved in the disclosure are only described for the convenience of differentiation, and are not used to limit the scope of the embodiments of the disclosure, but to indicate the order of precedence.

The term "at least one" in the disclosure may also be described as one or more, and the term "multiple" may be two, three, four or more, which is not limited in the disclosure. In the embodiments of the disclosure, for technical features, "first", "second", and "third", and "A", "B", "C" and "D" are used to distinguish different technical features, the terms of "first", "second", and "third", and "A", "B", "C" and "D" do not indicate any order of precedence or magnitude.

The correspondences shown in the tables in this disclosure may be configured or predefined. The values of information in the tables are merely examples and may be configured as other values, which is not limited by the disclosure. When configuring the correspondence between the information and the parameter, it is not necessarily required that all the correspondences illustrated in the tables must be configured. For example, the correspondences illustrated in certain rows in the tables in this disclosure may not be configured. For another example, the above tables may be adjusted appropriately, such as splitting, combining, and the like. The names of the parameters shown in the headings of the above tables may be other names that can be understood by the communication device, and the values or representations of the parameters may be other values or expressions that can be understood by the communication device. Each of the above tables may also be implemented using other data structures, such as, arrays, queues, containers, stacks, linear tables, pointers, chained lists, trees, graphs, structures, classes, heaps, and Hash tables.

The term "predefine" in this disclosure may be understood as define, define in advance, store, pre-store, pre-negotiate, pre-configure, solidify, or pre-burn.

Those skilled in the art may realize that the units and algorithmic steps of the various examples described in combination with the embodiments disclosed herein are capable of being implemented in the form of electronic hardware, or a combination of computer software and electronic hardware. Whether these functions are performed in the form of hardware or software depends on the specific application and design constraints of the technical solution. Those skilled in the art may use different methods to implement the described functions for each specific application, but such implementations should not be considered as beyond the scope of the disclosure.

Those skilled in the art clearly understand that, for the convenience and brevity of description, the specific working processes of the systems, apparatuses, and units described above can be referred to the corresponding processes in the preceding method embodiments, and will not be repeated herein.

The above implementations are only specific implementations of the disclosure, but the scope of protection of the disclosure is not limited thereto. Those skilled in the art can easily think of changes or substitutions in the technical scope disclosed by the disclosure, which shall be covered by the scope of protection of the disclosure. Therefore, the scope of protection of the disclosure shall be governed by the scope of protection of the stated claims.

What is claimed is:

1. A method for processing data reception, performed by a terminal device, comprising:

receiving a first downlink control information (DCI) sent by a network device, wherein the first DCI is configured to indicate data transmission in a Hybrid Automatic Repeat reQuest (HARQ) process; and determining a type of data transmitted in the HARQ process indicated by the first DCI based on the type of the first DCI and contents included in the first DCI, in response to an identifier of a physical downlink control channel (PDCCH) corresponding to the first DCI as a broadcast or multicast scheduling identifier;

wherein determining the type of data transmitted in the HARQ process indicated by the first DCI based on the type of the first DCI and the contents included in the first DCI comprises:

determining that the data transmitted in the HARQ process indicated by the first DCI is new transmission data, in response to a HARQ process number in the first DCI being identical to a HARQ process number in a fifth DCI;

wherein the fifth DCI has a smallest time difference of a reception moment among DCIs each corresponding to a different PDCCH from the first DCI and corresponding to the broadcast or multicast scheduling identifier or a unicast scheduling identifier.

2. The method of claim 1, further comprising:

determining the type of the first DCI based on a radio network temporary identity (RNTI) corresponding to the first DCI;

wherein the contents included in the first DCI comprise at least one of: a value of a New Data Indicator (NDI) or a HARQ process number.

3. The method of claim 1, wherein determining the type of data transmitted in the HARQ process indicated by the first DCI based on the type of the first DCI and the contents included in the first DCI comprises:

determining that the data transmitted in the HARQ process indicated by the first DCI is new transmission data, in response to a HARQ process number in the first DCI being identical to the HARQ process number in a second DCI and a value of NDI in the first DCI being different from the value of NDI in the second DCI;

or, determining that the data transmitted in the HARQ process indicated by the first DCI is retransmission data, in response to a HARQ process number in the first DCI being identical to the HARQ process number in the second DCI and a value of NDI in the first DCI being identical to the value of NDI in the second DCI;

wherein the second DCI has a smallest time difference of a reception moment among DCIs corresponding to a same PDCCH as the first DCI.

4. The method of claim 3, wherein the same PDCCH comprise at least one of: same scheduling identifier information of the PDCCH or same resource configuration information of the PDCCH.

5. The method of claim 1, wherein determining the type of data transmitted in the HARQ process based on the type of the first DCI and the contents included in the first DCI comprises:

determining that the data transmitted in the HARQ process indicated by the first DCI is new transmission data, in response to a HARQ process number in the first DCI being identical to the HARQ process number in a third DCI and a value of NDI in the first DCI being different from the value of NDI in the third DCI;

or, determining that the data transmitted in the HARQ process indicated by the first DCI is retransmission data, in response to a HARQ process number in the first DCI being identical to the HARQ process number in the third DCI and a value of NDI in the first DCI being identical to the value of NDI in the third DCI;

wherein, a time difference between a reception moment of the third DCI and the reception moment of the first DCI is minimum among DCIs corresponding to the broadcast or multicast scheduling identifier or a unicast scheduling identifier.

6. The method of claim 1, wherein determining the type of data transmitted in the HARQ process based on the type of the first DCI and the contents included in the first DCI comprises:

determining that the data transmitted in the HARQ process indicated by the first DCI is new transmission data, in response to a HARQ process number in the first DCI being identical to a HARQ process number in a fourth DCI and a value of NDI in the first DCI being different from a value of NDI in the fourth DCI;

or, determining that the data transmitted in the HARQ process indicated by the first DCI is retransmission data, in response to a HARQ process number in the first DCI being identical to the HARQ process number in the fourth DCI and a value of NDI in the first DCI being identical to the value of NDI in the fourth DCI;

wherein a fourth DCI has a smallest time difference of a reception moment among DCIs each corresponding to a different PDCCH from the first DCI and corresponding to the broadcast or multicast scheduling identifier.

7. The method of claim 1, further comprising:

abandoning receiving first data indicated by the first DCI, in response to the first data being retransmission data corresponding to historical data that has been overwritten or cleared.

8. The method of claim 1, wherein first data indicated by the first DCI is retransmission data corresponding to historical data, and the method further comprises:

abandoning receiving the first data, in response to a sending moment of the first data indicated by the first DCI being after a sending moment of second data indicated by a sixth DCI;

or, abandoning receiving the first data, in response to a sending moment of the first DCI being after the sending moment of the sixth DCI;

or, determining reception priorities of the first data indicated by the first DCI and the second data indicated by the sixth DCI based on a first specified rule, in response to the sending moment of the first data being at least partially overlapped with the sending moment of the second data;

wherein a HARQ process number in the sixth DCI is identical to the HARQ process number in the first DCI.

9. The method of claim 8, further comprising:

receiving the first specified rule sent by the network device;

or, determining the first specified rule based on a protocol agreement;

wherein the first specified rule comprises any one of:

new transmission data of a unicast scheduling having a higher reception priority than retransmission data of a multicast scheduling; or the retransmission data having a higher reception priority than the new transmission data; or being based on a priority of interest of the terminal device.

10. The method of claim 1, wherein first data indicated by the first DCI is new transmission data, and the method further comprises:

abandoning receiving the first data indicated by the first DCI, in response to a sending moment of the first DCI being after a sending moment of a seventh DCI;

or, determining reception priorities of the first data and third data indicated by the seventh DCI, based on configuration information sent by the network device;

or, determining the reception priorities of the first data and the third data indicated by the seventh DCI, based on a second specified rule;

wherein the second specified rule comprises any one of:

the new transmission data of a unicast scheduling having a higher reception priority than retransmission data of a multicast scheduling; or being based on a priority of interest of the terminal device.

11. The method of claim 7, further comprising:

sending feedback information to the network device, in response to the terminal device abandoning receiving the data transmitted in the HARQ process indicated by the first DCI, wherein the feedback information is configured to indicate, to the network device, a reception failure of the data transmitted in the HARQ process indicated by the first DCI;

or, abandoning sending feedback information to the network device, in response to the terminal device abandoning receiving the data transmitted in the HARQ process indicated by the first DCI.

12. A method for processing data reception, performed by a network device, comprising:

determining a type of first downlink control information (DCI) corresponding to a Hybrid Automatic Repeat reQuest (HARQ) process and contents included in the first DCI based on a type of data to be transmitted, in response to determining the data to be transmitted in the HARQ process; and sending the first DCI to a terminal device, wherein the first DCI is configured to indicate data transmission in the HARQ process, and an identifier of a physical downlink control channel (PDCCH) corresponds to the first DCI as a broadcast or multicast scheduling identifier;

wherein determining the type of the first DCI corresponding to the HARQ process and the contents included in the first DCI based on the type of the data to be transmitted comprises:

in response to the data to be transmitted in the HARQ process being new transmission data, determining a HARQ process number in the first DCI being identical to a HARQ process number in a fifth DCI, wherein the fifth DCI has a smallest time difference of a reception moment among DCIs each corresponding to a different PDCCH from the first DCI and corresponding to the broadcast or multicast scheduling identifier or a unicast scheduling identifier.

13. The method of claim 12, further comprising:

determining the type of the first DCI based on a radio network temporary identity (RNTI) corresponding to the first DCI;

wherein the contents included in the first DCI comprise at least one of: a value of New Data Indicator (NDI) or a HARQ process number.

14. The method of claim 13, further comprising:

sending a first specified rule to the terminal device, wherein the first specified rule is configured to indicate, to the terminal device, reception priorities of new transmission data and retransmission data transmitted based on a same HARQ process;

wherein the first specified rule comprises any one of:

new transmission data of a unicast scheduling having a higher reception priority than retransmission data of a multicast scheduling; or the retransmission data having a higher reception priority than the new transmission data; or being based on a priority of interest of the terminal device.

15. The method of claim 13, further comprising:

sending a second specified rule to the terminal device, wherein the second specified rule is configured to indicate, to the terminal device, reception priorities of multiple pieces of new transmission data transmitted based on a same HARQ process;

wherein the second specified rule comprises any one of:

new transmission data of a unicast scheduling having a higher reception priority than retransmission data of a multicast scheduling; or being based on a priority of interest of the terminal device.

16. A communication device, comprising a processor and a memory having a computer program stored thereon, wherein when the computer program is executed by the processor, the device is caused to:

receive a first downlink control information (DCI) sent by a network device, wherein the first DCI is configured to indicate data transmission in a Hybrid Automatic Repeat reQuest (HARQ) process; and determine a type of data transmitted in the HARQ process indicated by the first DCI based on a type of the first DCI and contents included in the first DCI, in response to an identifier of a physical downlink control channel (PDCCH) corresponding to the first DCI as a broadcast or multicast scheduling identifier;

wherein the device is further caused to:

determine that the data transmitted in the HARQ process indicated by the first DCI is new transmission data, in response to a HARQ process number in the first DCI being identical to a HARQ process number in a fifth DCI;

wherein the fifth DCI has a smallest time difference of a reception moment among DCIs each corresponding to a different PDCCH from the first DCI and corresponding to the broadcast or multicast scheduling identifier or a unicast scheduling identifier.

17. A communication device, comprising a processor and a memory having a computer program stored thereon, wherein when the computer program is executed by the processor, the device is caused to perform the method of claim 12.

18. A non-transitory computer readable storage medium, having instructions stored thereon, wherein when the instructions are executed, the method of claim 1 is performed.

19. A non-transitory computer readable storage medium having instructions stored thereon, wherein when the instructions are executed, the method of claim 12 is performed.

* * * * *